United States Patent [19]
Carlson et al.

[11] Patent Number: 5,516,323
[45] Date of Patent: May 14, 1996

[54] METHOD AND APPARATUS FOR BLENDING AIR BEARING SLIDERS

[75] Inventors: Carl J. Carlson, Poway; Ponna P. Pa, San Diego; Jon L. Allen, El Cajon, all of Calif.

[73] Assignee: Sunward Technologies, Inc., San Diego, Calif.

[21] Appl. No.: 260,029

[22] Filed: Jun. 15, 1994

[51] Int. Cl.$^6$ ....................................................... B24B 1/00
[52] U.S. Cl. ............................................... 451/28; 451/54
[58] Field of Search ................................. 451/28, 54, 47

[56] References Cited

U.S. PATENT DOCUMENTS

| | | | |
|---|---|---|---|
| 3,823,416 | 7/1974 | Warner | 360/122 |
| 4,098,032 | 7/1978 | Olbert | 451/57 |
| 4,285,019 | 8/1981 | Scott et al. | 360/103 |
| 4,333,229 | 6/1982 | Ellenberger | 29/603 |
| 4,673,996 | 6/1987 | White | 360/103 |
| 4,870,519 | 9/1989 | White | 360/103 |

FOREIGN PATENT DOCUMENTS 62-03355  7/1994  Japan.

*Primary Examiner*—Bruce M. Kisliuk
*Assistant Examiner*—Derris H. Banks
*Attorney, Agent, or Firm*—Fish & Richardson

[57] ABSTRACT

A method and apparatus for "blending" air bearing rails of a magnetic air bearing slider used to carry a recording mechanism over a magnetic recording medium. In accordance with the present invention, a slider is held at a fixed angle with respect to a at least one essentially flat, abrasive blending surface, preferably configured as an elongated bar having a blending surface. The relative angle of the slider with respect to the plane of the blending surface causes an edge of a slider rail to make contact with the blending surface. A relative motion of the blending surface with respect to the slider in two generally orthogonal directions abrades the edge of the slider rail, generating a contoured edge, or "blend" on the slider rail which allows the slider to fly at approximately the same height over a disk medium over a broad range of skew angles and radial distances.

40 Claims, 19 Drawing Sheets

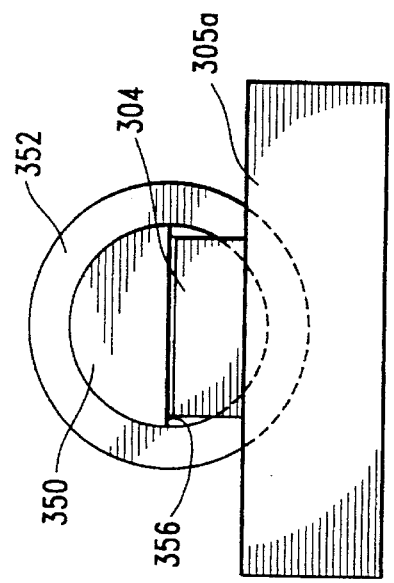
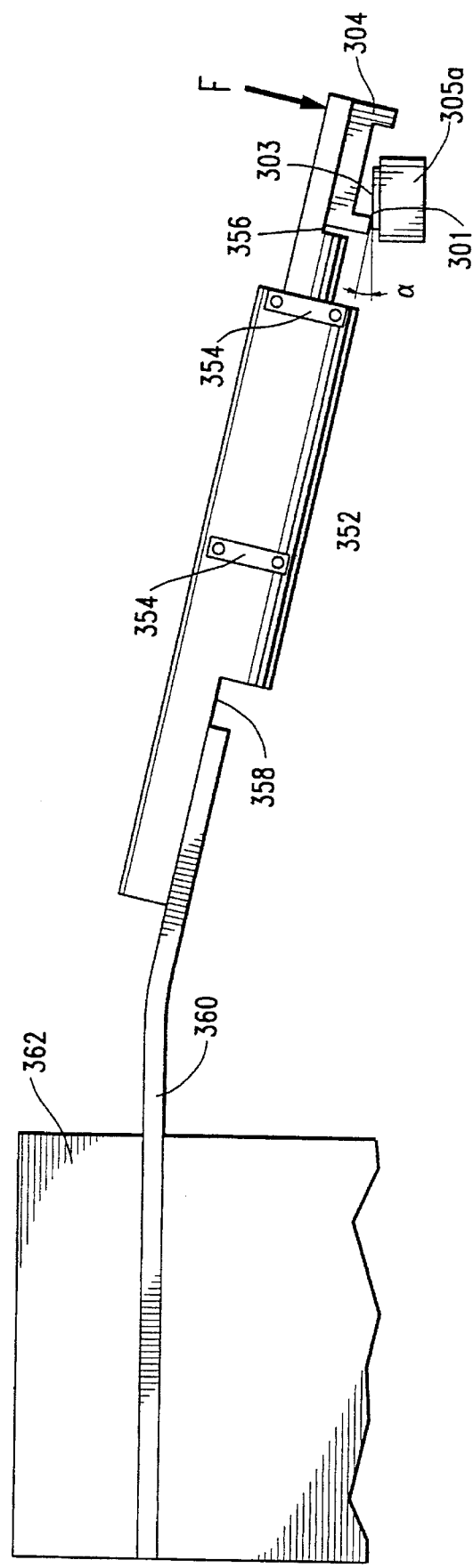
FIG. 5b
FIG. 5a

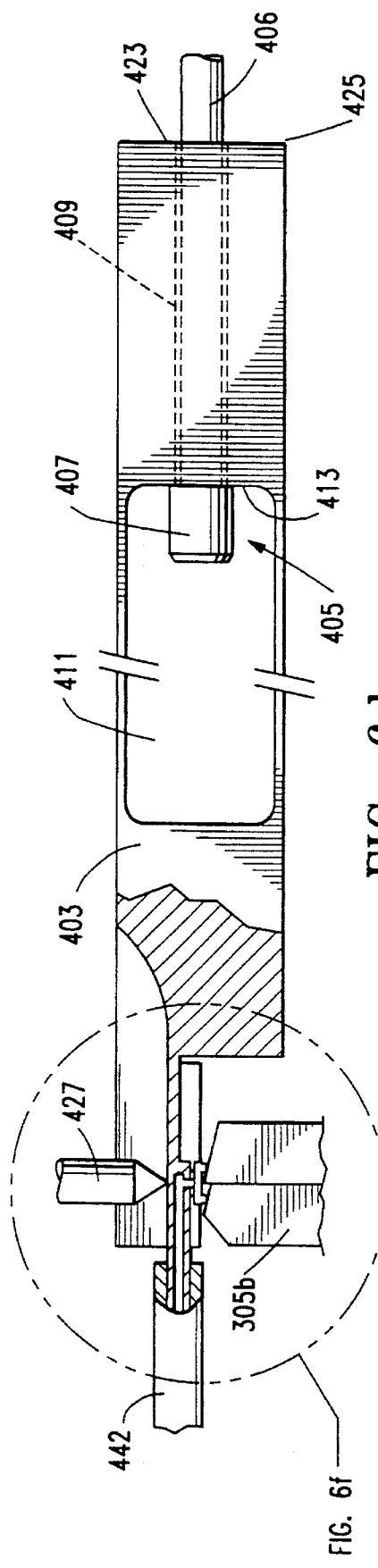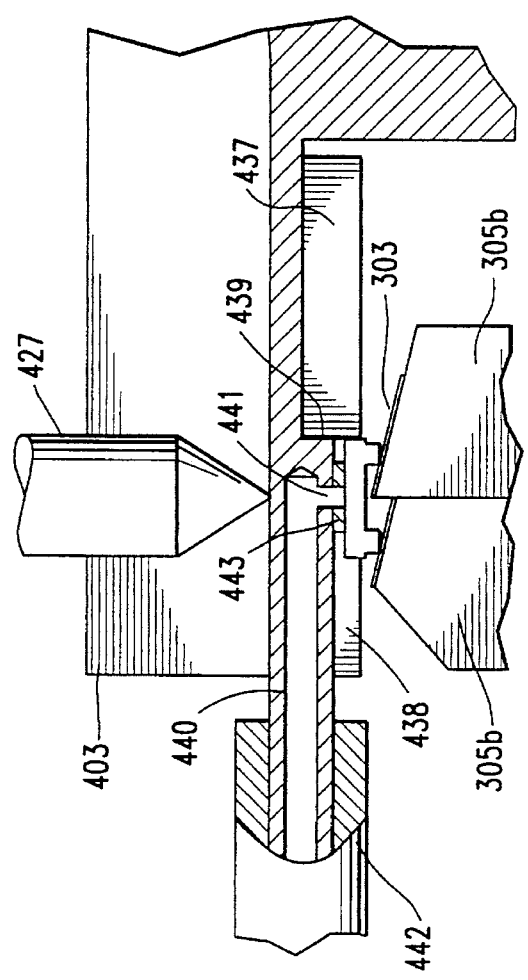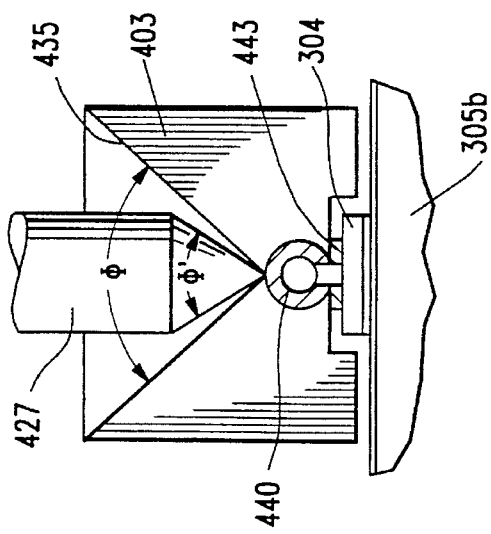
FIG. 6d
FIG. 6f
FIG. 6e

METHOD AND APPARATUS FOR BLENDING AIR BEARING SLIDERS

BACKGROUND OF THE INVENTION

1. Field of the Invention

This invention relates to a method and apparatus for manufacturing air bearing sliders for use in computer storage devices, and more particularly to a method and apparatus for forming edge contours on such air bearing sliders.

2. Description of Related Art

Magnetic recording systems utilizing transducers that are supported by an air bearing layer as they move relative to the surface of a magnetic recording disk are well known in the art. Each transducer is mounted in a slider assembly which has a contoured surface. The air bearing is produced by pressurization of the air as it flows between the disk and slider, and is a consequence of the slider contour and relative motion of the two surfaces. The purpose of the air bearing is to provide a very narrow clearance, with minimal or no contact, between the slider and rotating disk. Thus, transducers "fly" on a layer of pressurized air at just a few microinches above a rotating disk surface. This allows a high density of magnetic data to be transferred and reduces wear and damage to the magnetic assembly and recording media during operation.

Typical sliders of the prior art, as illustrated in FIG. 1, utilize at least two lower rails 1a, 1b having flat surfaces 2 oriented toward the recording medium and extending from the body 5 of the slider. Each of these rails 1a, 1b has a tapered forward surface 3a, 3b oriented against the direction of rotation 4 of the recording medium. The rotating recording medium forces air by viscous effects into the tapered forward surfaces 3a, 3b, and thereby produces a pressure beneath each of the rails 1a, 1b, resulting in the air bearing. These sliders are typically gimbal-mounted to a load beam assembly which is attached to an arm. The arm is driven by an actuator which positions the transducer over the recording surface from one data track to another. The arm can move in a linear motion (which is termed linear access) or it can rotate about a pivot point (which is termed rotary access). With rotary access, the slider will be positioned at varying angles with respect to the direction of the disk rotation as the slider moves over the recording surface. This angular orientation is referred to as the "skew" angle.

When a typical slider is positioned so as to have any angular skew, the rotation of the recording medium introduces pressurized air at the forward edge of the slider, thereby generating the air bearing. However, this air is pressurized at a reduced value because of the skew, thus giving rise to a reduction in the flying height. Also, the skew angle gives rise to a roll of the slider such that the air bearing flying height is not uniform under both of the rails 1a, 1b. Accordingly, the position of the transducer with respect to the recording medium can vary as the slider is caused to roll in one direction or the other or fly at different heights. Such variations in flying height adversely affect the data transfer between transducer and recording medium. In particular, the density of bit storage is adversely affected if the flying height of a slider is increased.

Furthermore, the slider must move radially across the recording medium at a substantial rate of speed to access various portions of the medium. This motion also introduces air under one edge of each slider rail 1a, 1b and results in a roll of the slider and a change in the spacing between the transducer and the recording medium. When any of these variations of spacing occur, particularly with a substantially reduced spacing between the slider and the recording medium, contact may occur between the slider (and its transducer) and the recording medium, or at least potentially rough surfaces thereof. Any such contact causes wear to the slider and the recording surface.

Moreover, the relative speed between the magnetic disk and the slider varies as a slider moves from an inner diameter of the recording medium to an outer diameter. Such variations in speed result in variations of air flow under a slider, which changes the flying height of the slider. As noted previously, such variations in flying height adversely affect the data transfer between transducer and recording medium.

One solution that has been proposed for minimizing change in the flying height and roll of a slider as skew angle or relative air flow speed changes is to provide a transverse pressurization contour along each side edge of the air bearing surfaces 2 of the slider, such that any air flow from the side of the slider assembly due to skew angle and/or access velocity produces pressurization adjacent to one side edge and depressurization (or expansion) adjacent to the other side edge of each air bearing surface 2. Selection of transverse pressurization contours (or "TPC"s) can be made which makes the slider assembly flying height and roll angle essentially insensitive to skew angle and/or access velocity and/or air flow speed. A design of a slider having such a transverse pressurization contour is disclosed in U.S. Pat. No. 4,673,996 ("the '996 patent"). The '996 patent shows three transverse pressure contours for air bearing sliders (see FIGS. 6 and 7 of the '996 patent). However, a problem arises with such TPC designs in fabricating the fairly precise angles or angular structures required to form the transverse pressurization contour on an air bearing edge. Considering the contours shown in the '966 patent, the angled contours of the left hand air bearing surface of FIG. 6, and the rounded contours shown in FIG. 7, are difficult to manufacture on a repetitive, reliable basis.

The step structure of FIG. 6 of the '966 patent is generally preferred over other transverse pressurization contours. However, such a structure is quite expensive to manufacture. Normally, such a step structure could not be machined into the slider air bearing surface using conventional machining. The depth of the step is typically about 30 microinches, ±5 microinches. Conventional machining in a production environment permits tolerances of only about ±300 microinches.

One method of fabricating such step structures is to etch (e.g., chemically etching) the slider material. However, most sliders are made of calcium titanate or polycrystalline ferrite material, zirconia, or alumina titanium carbide (for thin film heads). These materials are not generally etchable with the degree of precision required to make a step structure. While single-crystal ferrite material can be chemically etched, this material is, at present, quite expensive, and requires a relatively expensive photomasking operation to shield portions that are not to be etched. Another method for forming TPC step structures is ion milling. However, this process is also expensive.

In accordance with another method for fabricating TPCs on a slider, taught in U.S. Pat. No. 5,156,704, assigned to the assignee of the present application, slots are formed in a slider blank adjacent the location where air bearing surfaces are to be formed. The slots are filled with an etchable material (e.g., glass), and the slider blank is then machined to form air bearing structures. The etchable material is then carefully etched to form TPC step structures. However, this method requires a number of steps to be performed, and still involves substantial costs.

Independently, while working to improve the wear of the slider and the disk, it was discovered that blending the edge of air bearings to improve the wear of the slider and the disk affected the flying height, since the blends are TPCs. However, it was determined that some such techniques adversely affect the flying height characteristics of the slider. For example, a common method for blending a slider, referred to as "spin blending", is illustrated in FIG. 2a. In the method of FIG. 2a a slider 200 is rotated about a central axis 201. A sheet of flexible tape 203 coated with an abrasive substance is stretched across the slider 200. Stretching the tape 203 across the air bearing surface of the slider 200 causes greater pressure to be applied to the outer edges 205 of the rails of the slider 200. As the slider 200 rotates, the edges 205 are abraded to conform to the general contour of the curvature of the abrasive surface around the edges 205.

This method of abrading the edges of a slider by generating a relative motion between the slider and an abrasive tape is relatively inexpensive and can be relatively well controlled. However, spin blending adversely affects the flight of a slider. Spin blending primarily affects the outer edges 205 of the slider rails. This results in undesirable rolling and changes in the flying height as the slider changes radial distance and skew angle when rotary actuators are used to position the slider with respect to a disk, as is common practice today.

In response to the undesirable flying profile which resulted from spin blending, a variation on the process, referred to as an "X-Y blending technique" was developed. FIG. 2b illustrates the X-Y blending technique. A slider 200 is mounted within a window 208 of a fixture 210. The window 208 generally conforms to the outside dimensions of the slider 200 to capture the slider 200. The fixture 210, and hence the slider 200, moves in two orthogonal directions X, Y which define a plane parallel to the air bearing surfaces of the slider 200. The slider 200 is placed in contact with a lapping film 212 which has a soft, compressible backing. A force F is applied by the fixture 210 to the slider 200 to press the slider into the lapping film 212. The relative X-Y motion of the slider 200 with respect to the lapping film 212 causes the edges 214 of the slider to be abraded. Due to compression of the backing of the lapping film, both edges 214 of the rails of the slider 200 are abraded without abrading the air bearing surfaces. X-Y blending is capable of providing a more symmetrical blend, and thus improves the flying profile across the disk of a blended slider. This method of blending the edges of a slider by generating a relative motion in two orthogonal directions between the slider and an abrasive surface on a compressible backing is also relatively inexpensive and can be relatively well controlled.

However, the X-Y blending technique has the disadvantage that the inside edges are not blended as deeply as the outer edges. Also, the relative amount of contouring at each outside edge is essentially the same, and the contouring at each inside edge is essentially the same as each other inside edge, but may be different from each outside edge contour. In some cases, it is desirable for the contour at the inside edge of a first rail and the outside edge of a second rail to be equal, and the contour at the inside edge of the second rail and the outside edge of the first rail to be equal but different from the first contour.

Therefore, it would be desirable to form, with high precision, non-uniform contours on the air bearing edges of a slider rail. Such non-uniform contours may be formed in any combination of blends, such that the best combination of edge contours may be formed to provide as close to uniform flying height as possible, and to allow greater control over the amount of lift provided by the air bearing at various points on the air bearing surface of the slider. The present invention provides a method and apparatus for achieving these objects.

SUMMARY OF THE INVENTION

The present invention is a method and apparatus for "blending" air bearing rails of a magnetic air bearing slider used to carry a recording mechanism over a magnetic recording medium. In accordance with a first embodiment of the present invention, a slider is held at a fixed angle with respect to an essentially flat, abrasive blending surface, preferably configured as an elongated bar having a blending surface. Alternatively, the blending surface may be curved. In accordance with the preferred embodiment of the present invention, the blending surface is essentially rigid, but may be compressible to allow a curved blend to be formed. The relative angle of the slider with respect to the plane of the blending surface causes an edge of a slider rail to make contact with the blending surface. A relative motion of the blending surface with respect to the slider in two generally orthogonal directions abrades the edge of the slider rail, generating a contoured edge, or "blend" on the slider rail. The amount of blending at the edge of the rail may be carefully controlled by controlling (1) the texture of the blending surface (i.e., the type of lapping film or abrasive), (2) the pressure with which the slider is held in contact with the blending surface, (3) the relative velocity of the slider with respect to the blending surface, (4) the amount of time the slider is subjected to the operation, (5) the angle between the plane of the air bearing surface and the blending surface, and (6) the way the lapping film or abrasive is held to the blending bar. In accordance with the first embodiment of the present invention, the procedure is preferably repeated four times for each slider (i.e., once on each of the four longitudinal edges of the two rails of a slider). Alternatively, in accordance with the first embodiment of the present invention, additional blends are added to one or more edges, one at a time, after X-Y blending.

In accordance with a second embodiment of the present invention, two edges of a slider may be blended concurrently using two essentially rigid blending surfaces. One blending surface is placed in contact with the inside edge of a first slider rail. The other blending surface of the second bar is placed in contact with the outside edge of a second slider rail. The angle of each resulting edge contour depends upon the orientation of the first blending surface with respect to the second blending surface.

In accordance with the present invention, a retaining fixture holds at least one slider in contact with a corresponding blending surface. The sliders are preferably placed into a cavity at the distal end of a suspension finger within the retailing fixture. A soft elastic cushion within the cavity allows the slider to gimbal. A vacuum system in conjunction with the suspension finger holds the slider in the cavity prior to, during, and after contact with each blending surface at a constant pressure. The soft elastic cushion additionally acts to seal the vacuum.

In accordance with a third embodiment of the present invention, a slider is blended in accordance with a prior art blending technique, such as a prior art X-Y blending technique, to form edge contours with a first depth. The inside edge of one rail and the outside edge of a second rail are then removed by a trimming process, such as grinding, causing the trimmed edges to have a relatively abrupt edge. The slider is then subjected to a lighter blending operation during which an edge contour is formed on each trimmed edge of each rail. Since the second blending operation is lighter than the first blending operation, the edge contours on the trimmed edges are smaller than the edge contours on those edges that were not trimmed.

In accordance with a fourth embodiment of the present invention, a slider and a plurality of spacers (which may be additional sliders) are blended using a layer of compressible material (or cushion) having an abrasive blending surface and a loading surface. A load bar is applied to the loading surface, and the sliders and spacers are placed into contact with the blending surface. The spacing of each of the sliders and spacers, and the surface tension at the blending surface are carefully maintained to control the angle at which the blending surface contacts the inside and outside edges of each slider rail. For example, by adjusting the firmness of the cushion, the angle at which the blending surface contacts the inside edge of each rail can be controlled. Once the firmness of the cushion is established, the spacing of the sliders and spacers can be set to determine the angle at which the blending surface of the cushion contacts the outer edge of each rail and the amount of blending of the inner verses the outer edge of the rail. By placing each slider such that it is rotated 180° with respect to each of the adjacent sliders (i.e., the left rail of each slider is adjacent to the left rail of one adjacent slider, and the right rail of each slider is adjacent to the right rail of another adjacent slider), additional sliders are used as spacers while blending those sliders, and the amount of edge contouring at the two outer edges of each rail can be independently controlled. This method has the advantage of being relatively simple to implement, and allowing the outside edges to be independently controlled. Since the distance between the inside edges of each rail essentially determine the blend applied to each inside edge, a third rail may be positioned to control the inside blends. Such a third rail may be removed after the blending operation. Alternatively, it may be possible to vary the firmness of the cushion to allow the amount of blending of the inside edges to be controlled.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 3b is a side plan view of the slider of FIG. 3a.

FIG. 5a is a side plan view of an inventive retention fixture in accordance with one embodiment of the present invention.

FIG. 5b is an end plan view of the inventive retention fixture of FIG. 5a.

FIG. 6d is a side plan view of an inventive suspension finger with a slider installed and resting on two blending bars.

FIG. 6e is a front plan view of an inventive suspension finger with a slider installed.

FIG. 6f is an enlarged view of a portion of an inventive suspension finger with a slider installed and resting on two blending bars.

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Overview

The present invention is a method and apparatus for blending air bearing rails of magnetic air bearing sliders used to carry a recording mechanism over a magnetic recording medium. "Blending" as used herein refers to the process of contouring edges of rails of a slider, including the leading and trailing edges, (for example, of the type described in U.S. Pat. No. 4,673,966, issued to White).

In accordance with one embodiment of the present invention, a first rail edge of one rail of at least one slider is completely blended in a first blending operation. Additional rails of each slider are blended in additional operations.

In accordance with another embodiment of the present invention, a first set of rail edges of at least one slider are completely blended in a first blending operation. Additional sets of edges are completely blended in additional blending operations.

In accordance with another embodiment of the present invention, a first set of rail edges are blended in a first blending operation. A subset of the first set of edges are trimmed to remove the contour created by the first blending operation. A second blending operation is then performed on each edge within the first set of edges.

In accordance with yet another embodiment of the present invention, the spacing between a slider and a plurality of spacers, which may be additional sliders to be concurrently blended, is controlled. The distance between each such slider determines the contour of each outer edge of the slider rails. The blend to the inside edges may be controlled by the presence of a third rail which is subsequently removed.

Figure 1:
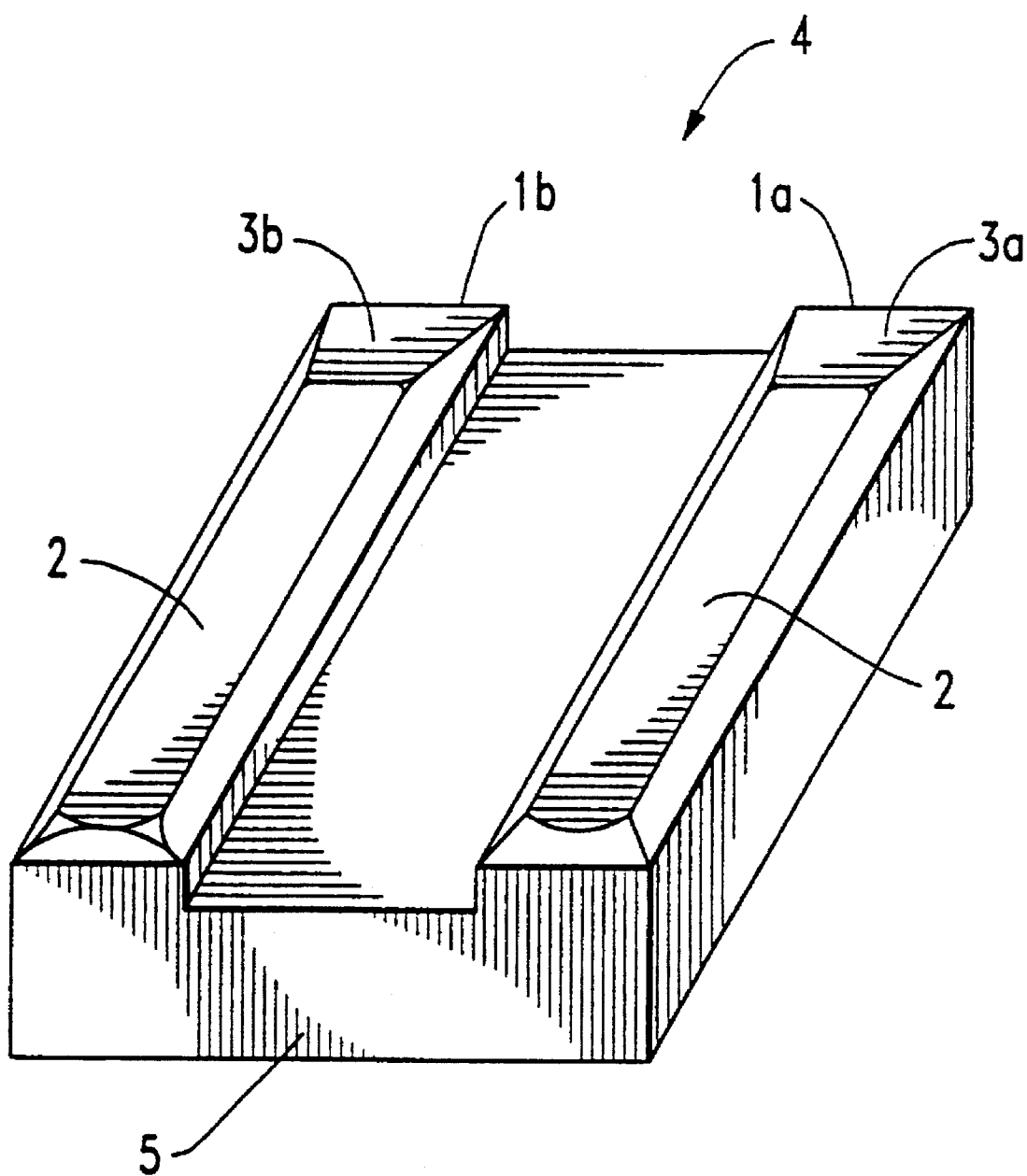
FIG. 1 is an perspective view of a prior art slider with transverse pressure contours.
Figure 2A:
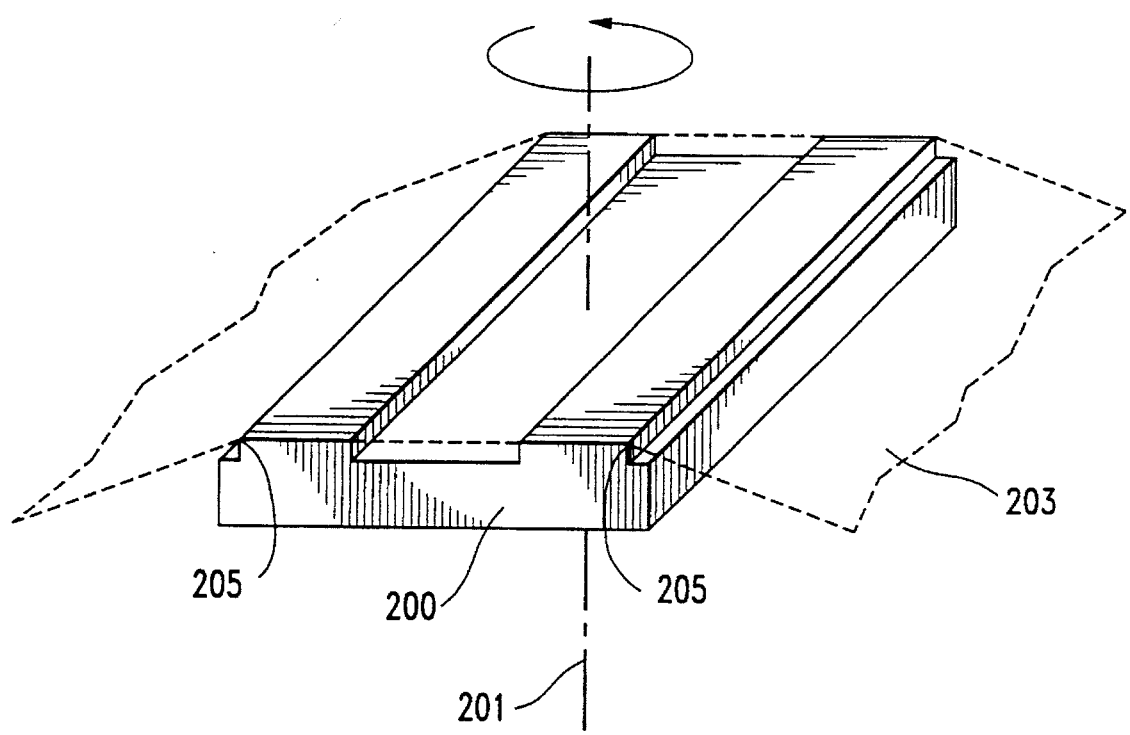
FIG. 2a illustrates a prior art method for blending a slider.
Figure 2B:
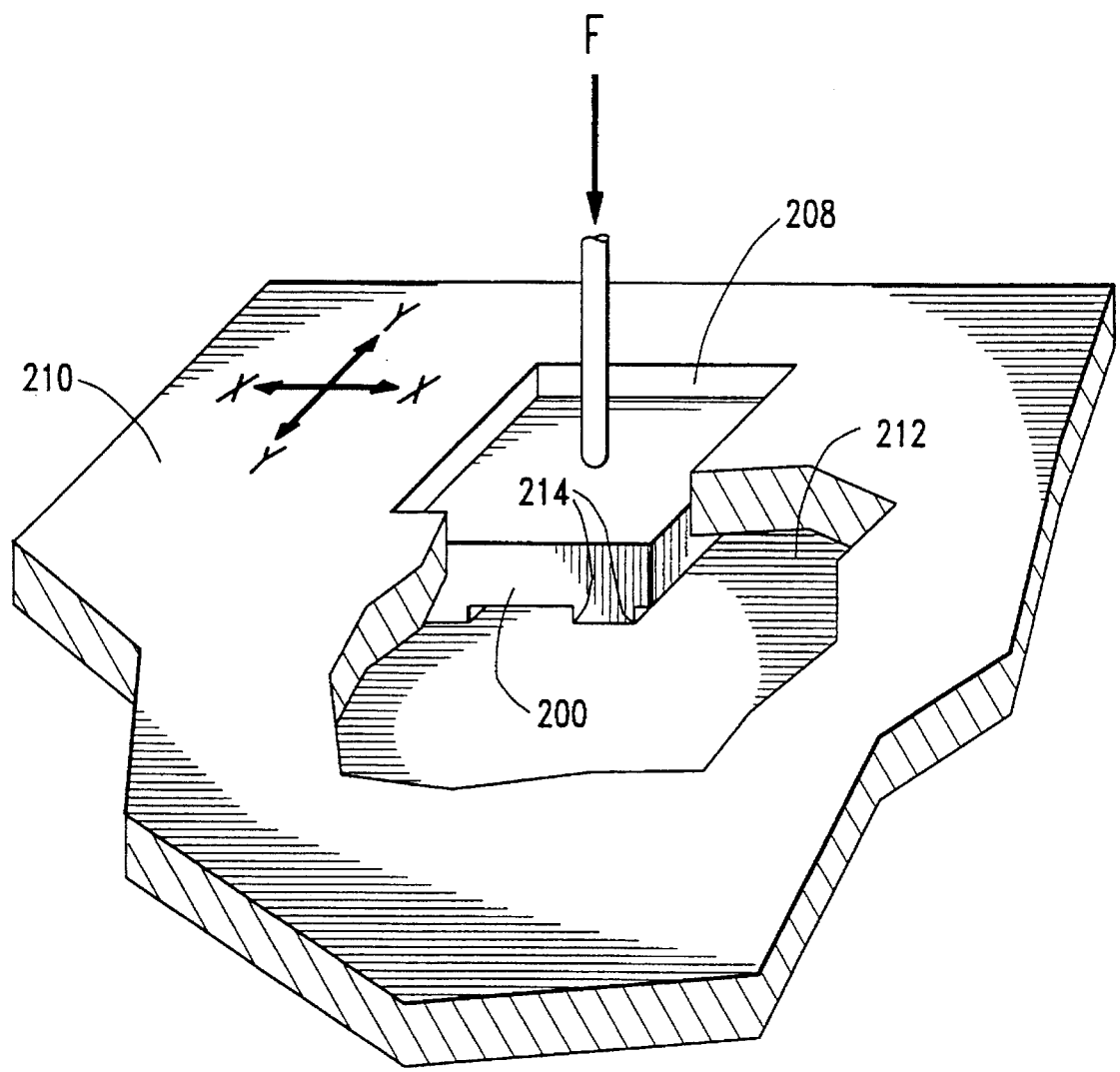
FIG. 2b illustrates another prior art method for blending a slider to create relatively poor transverse pressure contours.
Figure 3A:
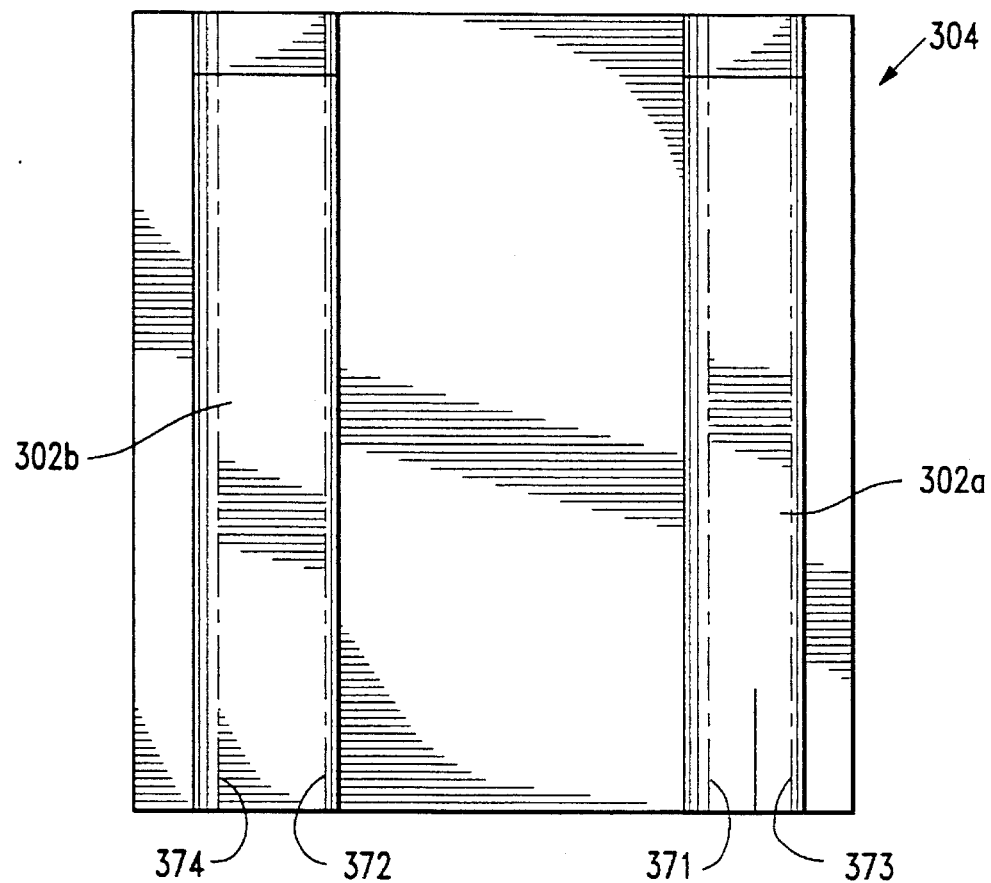
FIG. 3a is a bottom plan view of a slider having asymmetrical offset blends.
Figure 3B:
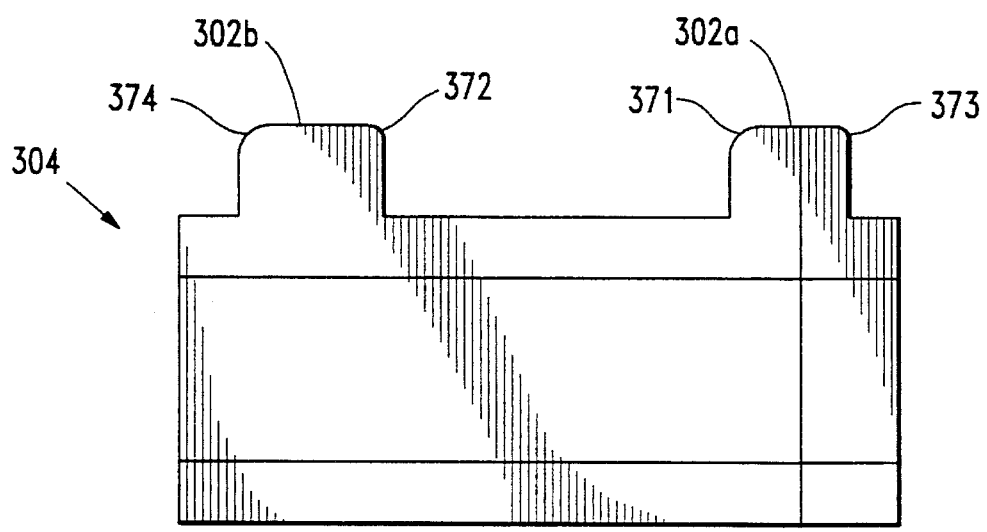

Each embodiment of the present invention can create any combination of blends to allow the slider to fly at nearly the same flying height regardless of the skew angle and radial distance of the slider from the center of rotation of the disk. For example, one desired combination of blends is shown in FIGS. 3a and 3b. FIGS. 3a and 3b show a slider 304 which has been asymmetrically offset blended in accordance with the present invention. Each rail 302a, 302b has an inside edge 371, 372, and an outside edge 373, 374. As shown in FIGS. 3a and 3b, the inside edge 371 of a first rail 302a and the outside edge 374 of a second rail 302b have been blended to a greater extent. The outside edge 373 of the first rail 302a and the inside edge 372 of the second rail 302b have been blended to a lesser extent. The blend combination of FIGS. 3a and 3b have a desirable effect, as predicted by others in the field. However, the method and apparatus for providing such a combination of blends was not previously known.

Single Blending Bar

Figure 4A:
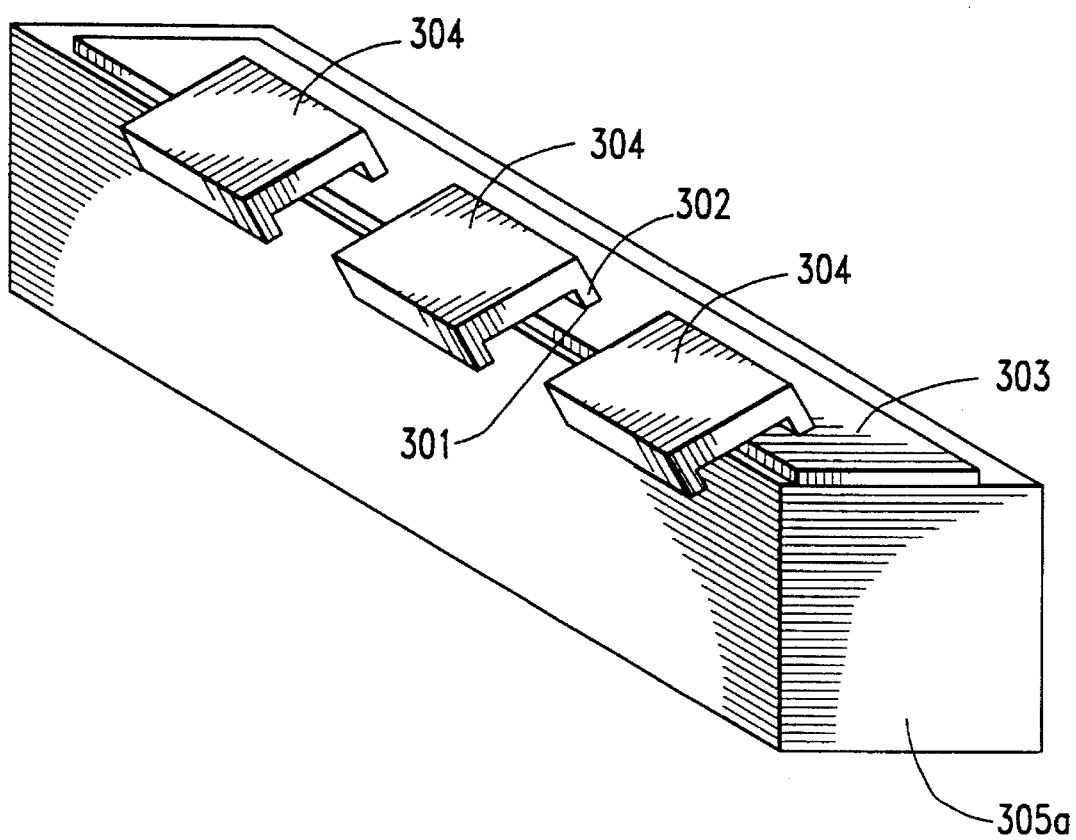
FIG. 4a illustrates three sliders having an inside edge of a rail in contact with an abrasive blending surface of a blending bar in accordance with one embodiment of the present invention.

In accordance with a first embodiment of the present invention shown in FIG. 4a, at least one slider 304 is held at a fixed angle with respect to a flat, rigid, abrasive blending surface 303, disposed upon a blending apparatus, preferably configured as a blending bar 305a. The relative angle of each slider 304 with respect to the blending surface 303 causes one edge of a slider rail 301 to make contact with the blending surface 303. Relative motion of the bar 305a with respect to each slider (preferably in two generally orthogonal directions which define a plane coincident with the air bearing surface of the rails to be blended) abrades the edge of each such slider rail, generating a contoured edge. Alternatively, it is possible to have a rotary cylinder (not shown) having an abrasive surface which causes relative motion when rotating and possible having a motion parallel to the radius of rotation. The radius of curvature of the cylinder could be relatively large.

The amount of abrasion to each rail may be carefully controlled by controlling (1) the texture of the blending surface 303, (2) the pressure with which each slider 304 is held in contact with the blending surface 303, (3) the relative velocity of each slider 304 with respect to the blending surface 303, and (4) the amount of time each slider 304 is subjected to the operation.

A first edge 301 of a corresponding rail 302 on a plurality of sliders 304 (three in FIG. 4a) are placed into contact with an abrasive blending surface 303 of an essentially rigid blending bar 305a having a generally square or rectangular cross-section. Sliders 304 are held such that the first edge 301 is in contact with the blending surface 303 and the plane of the air bearing surface of the rail 302 (hereafter referred to as the "slider plane") is at a precisely controlled angle $\alpha$ with respect to the plane of the blending surface 303.

The abrasive blending surface 303 is preferably a known abrasive tape (such as 0.5 micron diamond lapping film, having a 3 mil backing treated with an adhesive, which is distributed by 3M, St. Paul, Minn.) applied to the blending bar 305a. Tape has the advantage of being removable, so that the blending bars 305a may be reused. However, the invention encompasses any way of preparing the blending surface 303 of a blending bar 305a so as to be abrasive. For example, abrasive grit, or a thin, disposable, foil with loose abrasive slurry or paste, may be adhered directly to the blending bar 305b, or the blending surface 303 of a hardened blending bar 305a may be ground, machined, scored or etched to form an abrasive surface. Only one rail edge 301 of each slider may be blended at a time. Additional edges may be blended in additional procedures. Furthermore, each particular rail edge 301 may be blended to the same or a different degree from each other rail edge 301, including leading and trailing edges.

In the illustrated embodiment of the present invention, the bar 305a is set in motion in a Y direction while the slider 304 is set in motion in an X direction. The X direction is coincident with the longitudinal axis of the slider 304. The Y direction is at a right angle to the X direction and coincident with a plane parallel to the plane of the slider. The slider 304 preferably travels back and forth about 0.2 inches in the X direction in generally a simple harmonic motion of approximately 6 cycles per minute. The distance that the sliders 304 move in the X direction is preferably less than the distance between each slider 304 to avoid uneven abrasion due to areas of the blending surface 303 under the ends of each slider having more contact with the sliders 304 than areas under the center of each slider 304. The bar 305a preferably vibrates in the Y direction at a rate of about 60 Hz over a distance of approximately 0.003 inches. The combination of the motion in the X and the Y direction causes an even blending of the edge 301 of each rail 302.

The motion described in connection with the illustrated embodiment is merely an example of the relative motion of the blending surface 303 with respect to the slider 304. Naturally, any motion, or combination of motions which cause the blending surface 303 to evenly abrade the edge 301 of the slider 304 may be used. In addition, the slider 304 may be set in motion rather than, or in addition to, the blending surface 303.

Figure 4B:
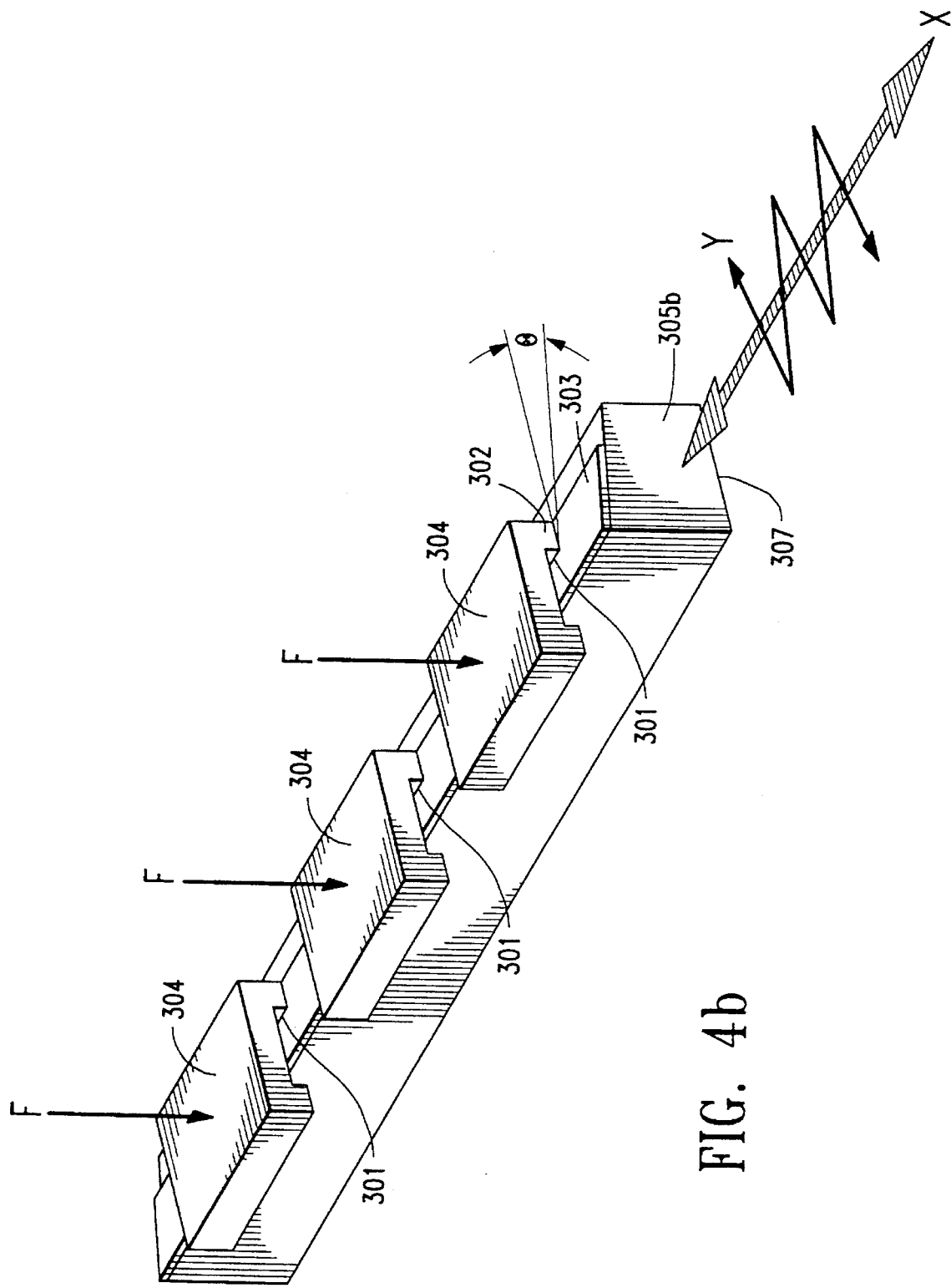
FIG. 4b illustrates three sliders having all inside edge of a rail in contact with an abrasive blending surface of a blending bar in accordance with another embodiment of the present invention.
Figure 4C:
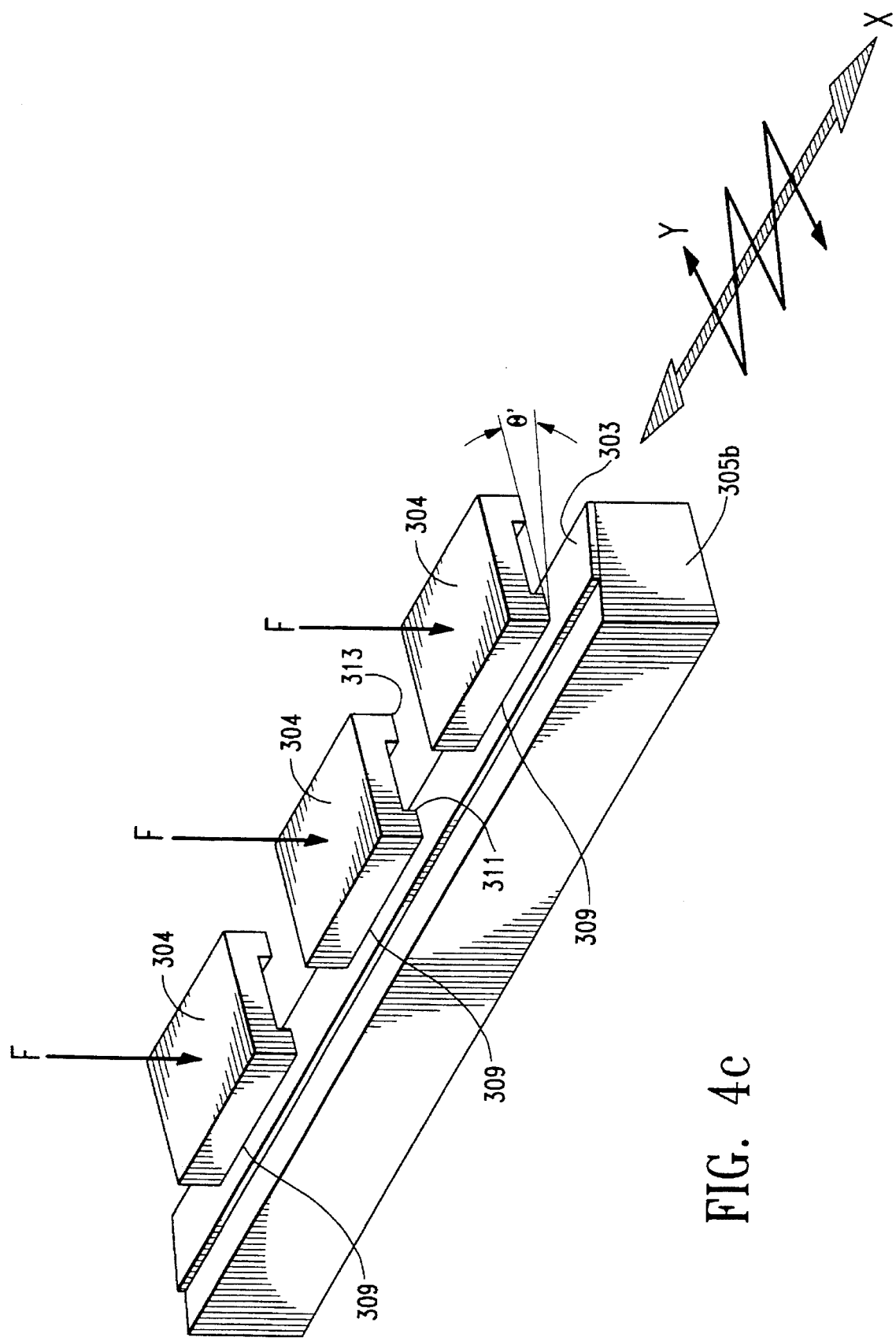
FIG. 4c illustrates three sliders having an outside edge of a rail in contact with an abrasive blending surface of a blending bar in accordance with the invention illustrated in FIG. 4b.

For example, in one embodiment of the present invention, the motion is generally in two orthogonal directions, i.e., along the longitudinal axis of the edge 301 being blended, and transverse to the longitudinal axis of the edge 301. The transverse motion is preferably a vibratory motion of the blending surface 303, while the longitudinal motion is preferably an oscillation of the slider 304 with respect to the blending surface 303, having a lower frequency and a longer amplitude then the vibratory motion of the blending surface 303. FIGS. 4b and 4c illustrate an alternative embodiment of the blending bars of the present invention. FIG. 4b illustrates a first edge 301 of the corresponding rail 302 on three sliders 304 placed into contact with all abrasive blending surface 303 of an essentially rigid blending bar 305b by applying a generally downward force F to each slider 304. In the embodiment depicted in FIGS. 4b and 4c, the blending bar 305b is tapered, such that the plane of the blending surface 303 is at an angle Θ with respect to the plane of the bottom surface 307 of the bar 305b. In the embodiment of the present invention illustrated in FIGS. 4b and 4c, the slider plane is parallel to the plane of the bottom surface 307 of the bar 305b. Therefore, an angle Θ is formed between the slider 304 and the blending surface 303. In one embodiment of the present invention, the angle Θ is about 1°.

In FIG. 4c, the same process as is illustrated in FIG. 4b is performed on a second edge 309. Either the same blending bar 305b as illustrated in FIG. 4b may be used to blend the second edge 309, or a blending bar 305b having a different angle Θ' may be used to produce an edge contour at the new angle Θ'. In addition, a different motion, or a different amount of time, may be used to generate a different amount of blending. The process may also be performed on the other two rail edges 311, 313 of the slider at any angle Θ', and for any duration.

Mulultiple Blending Bar

Figure 4D:
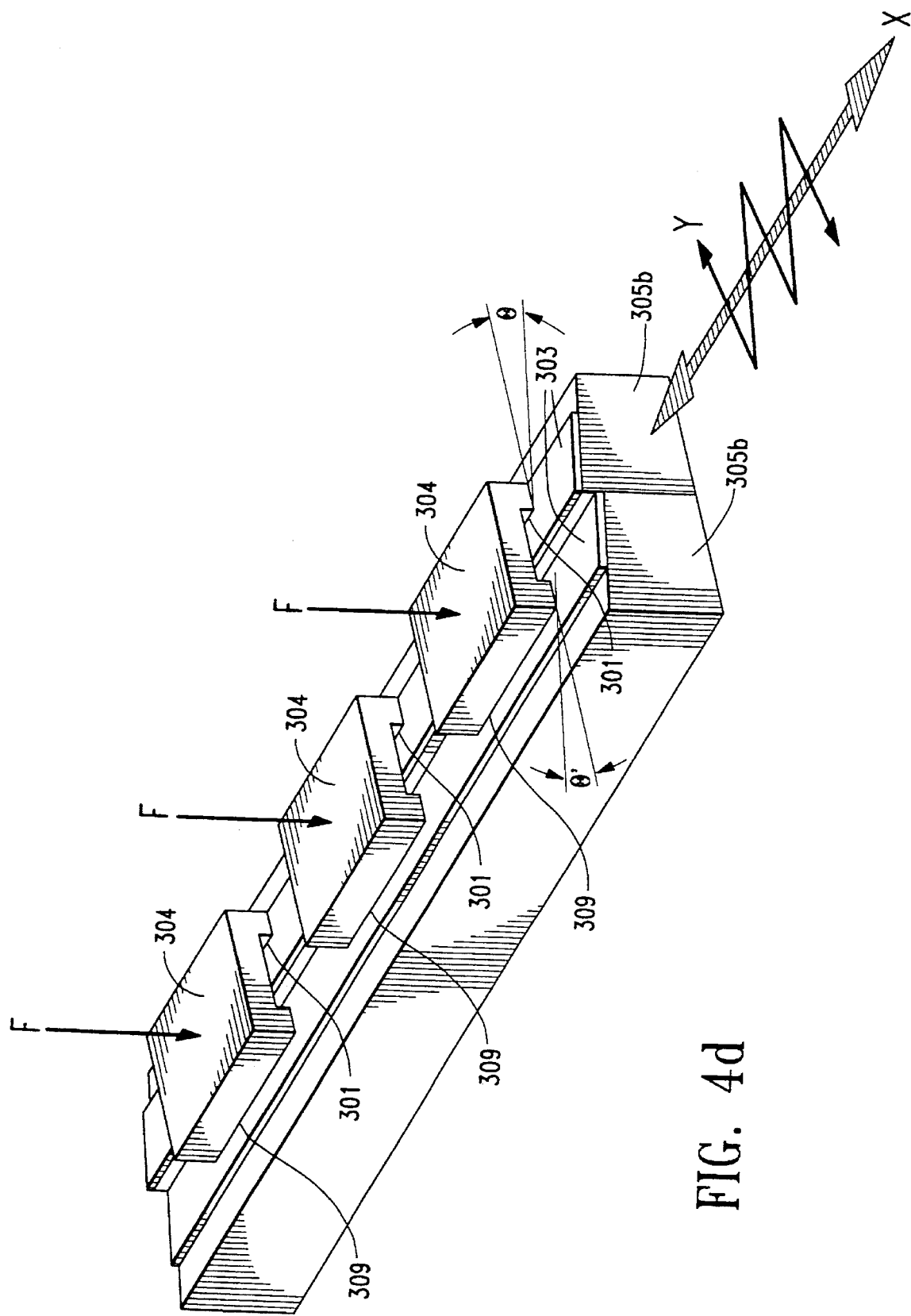
FIG. 4d illustrates three sliders having all outside edge of one rail in contact with a first blending surface, and an inside edge of a second rail in contact with a second blending surface, in accordance with the present invention.

In accordance with another embodiment of the present invention, each slider 304 is in contact with at least two blending bars, and the blending surface 303 of each blending bar 305b is in contact with one edge of each of the two rails of the slider. FIG. 4d illustrates the embodiment of the present invention in which two blending bars 305b are concurrently used. The blending surfaces 303 of each blending bar 305b are preferably coincident with parallel planes. The blending surfaces are also preferably essentially identical in texture. Thus, assuming that the force between each edge and the corresponding blending surface is essentially identical, the amount and angle of the edge contours formed on each edge 301,309 are essentially identical. However, in all alternative embodiment, each blending surface 303 may be uniquely angled, may have a different texture, or a different force may exist between the edge 301,309 and the corresponding blending surface 303, to provide different edge contours.

Retaining Fixture

FIG. 5a–5b illustrates one embodiment of the apparatus used to place at least one slider 304 into contact with an abrasive blending surface 303 of a blending bar 305a. Since each fixture used to hold each slider in contact with the blending surface 303 is essentially identical, only one such apparatus is shown here for brevity. In accordance with the embodiment of FIG. 5a–5b, a rotary shaft 350 which is preferably generally cylindrical protrudes from an arm housing 352. Bearings 354 within the arm housing 352 allow the rotary shaft 350 to rotate about a central longitudinal axis of the shaft 350. At the proximal end of the shaft 350, the shaft 350 is cut away, machined, or otherwise formed to provide a generally planar surface 356 to which a slider 304 may be affixed. The slider 304 is held rigid with respect to the housing arm 352 with the exception of the rotary motion allowed by the shaft 350. However, in an alternative embodiment, the shaft 350 is rigid with respect to the arm housing 352. In such an embodiment, the longitudinal axis of a slider 304 affixed to the shaft 350 is precisely controlled with respect to the plane of the blending surface 303. In the preferred embodiment, the angle is maintained at approximately 0°. However, other angles may be used to alter the flying characteristics of the slider, or for other purposes. In yet another embodiment of the present invention, the arm housing 352 is not necessary, assuming the angle between the longitudinal axis of a slider 304 affixed to the shaft 350 is precisely controlled with respect to the plane of the blending surface 303.

The slider 304 is preferably affixed to the planar surface of the shaft 350 by double-back tape. However, any method for affixing a slider 304 to the surface 356 is possible, such as adhesive (and more specifically, cyanoacrylates or other anaerobic adhesives), wax, clamps, vacuum, etc. The slider 304 is preferably mounted on the planar surface 356 of the shaft 350 such that the edge 301 to be blended is generally perpendicular to the longitudinal axis of the shaft 350. The longitudinal axis of the shaft 350 is coincident with the slider plane at one end of the shaft 350, and with an attachment surface 358 at the distal end of the arm housing 352. The ability of the shaft 350 to rotate causes the slider 304 to seat against the blending surface 303 such that the force between the blending surface 303 and the edge 301 is essentially constant along the edge 301.

The attachment surface 358 of the arm housing 352 is coupled to the proximal end of a leaf spring 360. The leaf spring 360 supports the distal end of the arm housing 352. The distal end of the leaf spring 360 is affixed to an angle adjustment block 362 which may preferably be raised or lowered to control the angle α between the plane of the slider plane and the plane of the blending surface 303. The leaf spring 360 accommodates the changes in the angle α. It should be noted that the arm housing 352 may be supported at the distal end by any means which allows the angle α to be changed by raising and lowering the distal end of the arm housing 352. In an embodiment in which no arm housing 352 is required, the shaft 350 is coupled directly to the leaf spring 360. For example, a hinged support structure (not shown) may be provided between the arm housing 352 and the angle adjustment block 362. The blend taper along the edge 301 of the slider rail 302 is controlled by mounting the slider 304 longitudinally at a precise location near the proximal end of the rotary shaft 350. The arm assembly preferably provides a generally downward force F required for blending. However, additional force may be provided by adding weight to the arm housing 352, applying pneumatic pressure by means of an air cylinder, applying spring tension, or by any other means for urging the arm housing 352 generally downward. Addition of such force will increase the abrasion rate.

Figure 5C:
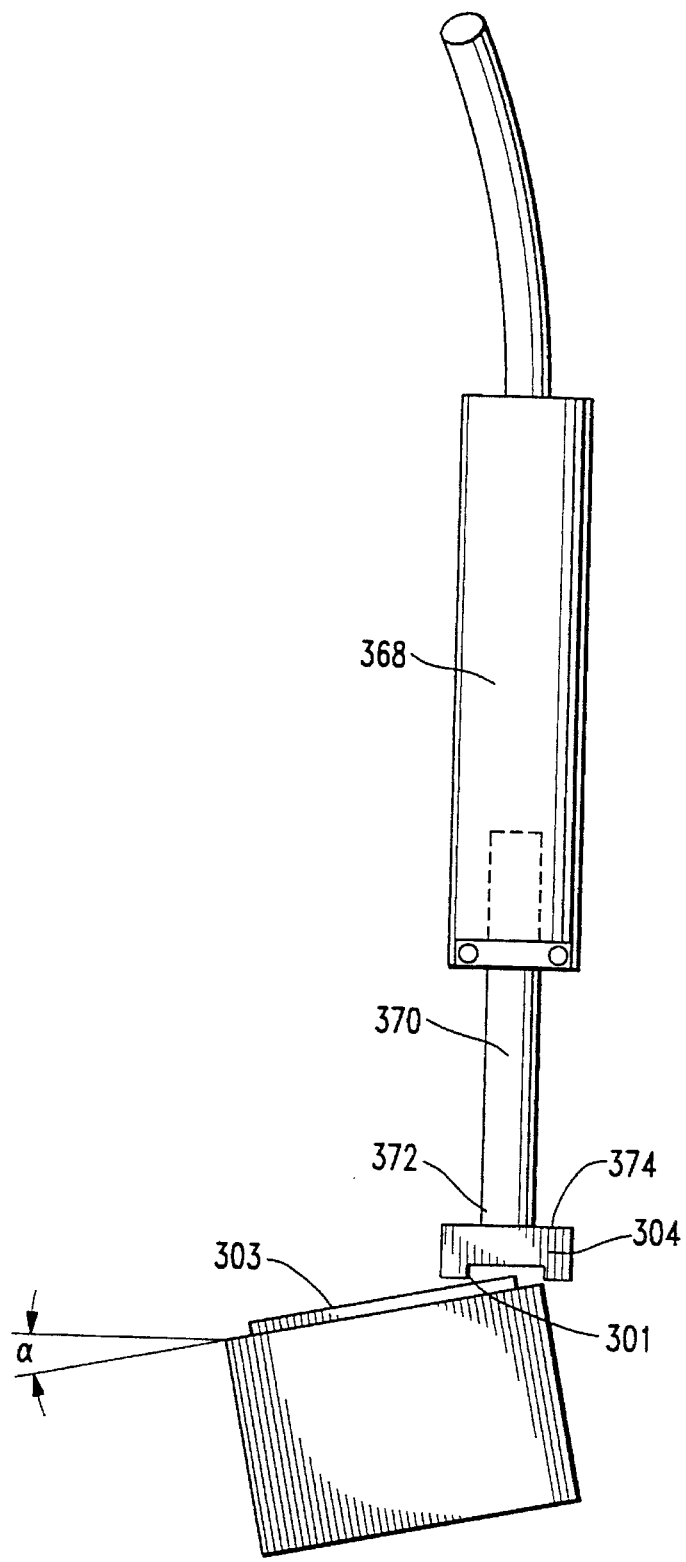
FIG. 5c is an alternative embodiment of the present invention having a fixed cylinder with a piston protruding to position a slider with respect to the blending surface.

Alternatively, other mechanisms may be used to hold the slider in contact with the blending surface. For example, FIG. 5c illustrates a fixed cylinder 368, having a piston 370 with a distal end 372 protruding from the cylinder 368 which may be used to position the slider 304 with respect to the blending surface 303 and maintain an essentially constant pressure between an edge 301 of the slider 304 and the blending surface 303. In such an embodiment, the cylinder 368 may be rigidly mounted with respect to the blending surface 303. At the distal end 372 of the piston 370, the slider 304 is mounted such that a surface 374 of the slider 304 opposite to, and generally parallel with, the air bearing surface of the slider 304. In one embodiment, each edge of the slider that is to be blended is generally approximately orthogonal to the longitudinal axis of the piston on which the slider 304 is mounted. By mounting the cylinder 368 at a precisely controlled angle α with respect to the blending surface 303, (which is preferably 1°) and projecting the piston 370 from the cylinder 368 such that the precisely controlled angle a is maintained between the slider mounted at the distal end of the piston and the blending surface 303, the edge 301 of the slider 304 to be blended may be brought into contact with the blending surface 303. The pressure that is exerted on the slider 303 by the piston may be precisely controlled by pneumatic or hydraulic means, a fixed weight applied to either the piston 370 or cylinder 368, or other such means. The slider 304 may be mounted by means of a gimbal which allows freedom of rotation about one or more axes. Such freedom of rotation allows the slider 304 to seat on the blending surface 303 such that the angle between the longitudinal axis of the slider 304 and the plane of the blending surface 303 is 0°. However, rotation about the longitudinal axis of the slider must be restricted so that the angle of the blend may be controlled. In accordance with an alternative embodiment, the angle formed between the longitudinal axis of the slider 304 and the blending surface 303 is also fixed and precisely controlled. Thus, rotational motion of the slider 304 about any axis generally parallel to the blending surface 303 is prevented.

Blending more than one edge at a time generally requires a retaining fixture that allows proper alignment of the slider with each blending surface to maintain essentially equal force between each rail edge 301,309 and the corresponding blending surface 303. FIGS. 6a–6f illustrate an embodiment of a retaining fixture 400 in accordance with the present invention which provides such proper alignment. The retaining fixture 400 of FIGS. 6a–6f may also be used to blend one edge of a plurality of sliders 304 at a time. The retaining fixture 400 comprises a frame 401 which carries a plurality of suspension fingers 403. Each suspension finger 403 is attached to the frame 401 by a securing pin 405, having a cylindrical body 406 extending to the distal end of the pin 405, and a cylindrical head 407 located at the proximal end of the pin 405. The diameter of the head 407 is greater than the diameter of the body 406. The securing pin 405 is inserted, distal end first, through a bore 409 in an interior wall 413 of an opening 411 in the central portion of the suspension finger 403. The opening 411 is at least as long as the securing pin 405 to allow the securing pin 405 to be aligned with the bore 409 and thus inserted through the bore 409. The bore 409 preferably has an inside diameter that is slightly larger than the diameter of the body 406 of the securing pin 405 and smaller than the diameter of the head 407 of the pin 405, such that the suspension finger 403 may freely rotate about the longitudinal axis of the pin 405 while being captured by the head 407. In the illustrated embodiment, the longitudinal axis about which each suspension finger 403 rotates, passes through the approximate center of a slider 304 when the slider 304 is properly seated in the finger 403 to allow the force which is applied to the slider 304 to be distributed uniformly along the length of each rail edge 301, 309 to be blended. Alternatively, the finger 403 is rigidly fixed to the frame 401. In such an embodiment, the angle of the longitudinal axis of a slider 304 seated within the frame 401 is precisely controlled with respect to the plane of the blending surface 303 by controlling the relative position at which the finger 403 is fixed to the frame 401. Thus, the slider is not free to rotation about any axis that is generally parallel to the blending surface 303. The angle between the longitudinal axis and the blending surface 303 may be maintained at approximately 0°. However, other angles may be used to alter the flying characteristics of the blended slider 304, or for other purposes. In yet another embodiment of the present invention, the finger 403 is part of the frame 401, and the angle between the longitudinal axis of a slider 304 seated in the frame is precisely controlled with respect to the plane of the blending surface 303 by producing the frame 401 such that the surface to which the slider 304 is to be seated is at the desired angle. Thus, rotational motion about any axis that is generally parallel to the blending surface 303 is prevented.

The distal end of the securing pin 405 is attached to a spring member 421 that captures the suspension finger 403 within the frame 401. Ideally, the suspension finger 403 is suspended over the blending bars 305b such that the edges 301, 309 of a slider 304 that are to be blended rest on the blending surfaces 303 with little or no force applied between the slider 304 and the blending surface 303. In accordance with the illustrated embodiment, the distance between the suspension finger 403 and the blending surface is essentially fixed during the blending operation.

In accordance with the preferred embodiment of the present invention, an essentially constant pressure is applied to the distal end of the suspension finger 403, and thus between the edge of a slider rail which is in contact with the blending surface, during a blending process. Air pressure is applied through a main air coupling 430 (see FIG. 6a) and an air line 429, to an air chamber 431. The air chamber 431 has solid walls, with the exception of a diaphragm 433 which forms the bottom of the chamber 431, as best illustrated in FIG. 6c. A first surface of the diaphragm 433 is exposed to the interior of the chamber 431. A second surface of the diaphragm 433, which is opposed to the first surface, is in contact with the proximal end of a pressure pin 427. Preferably, when the air pressure within the chamber is approximately at atmospheric pressure, the pressure between the slider 304 and the blending surface 303 is at a first value, which is preferably significantly less than the weight of the suspension finger 403. When air pressure is applied, the diaphragm 433 applies pressure to the pressure pin 427, forcing the pressure pin 427 to exert pressure on the suspension finger 403. Accordingly, the pressure exerted on the pressure pin 427 is essentially equal to the increase in pressure within the chamber 431. Therefore, the total pressure that is exerted between the slider 304 and the blending surface 303 is proportional to the air pressure applied to the chamber 431.

Referring now to FIG. 6e, the distal end of the pressure pin 427 has a generally conical shape that causes the pin 427 to seat in a generally V-shaped recess 435 in the suspension finger 403. Because the recess 435 has a V-shape having an angle φ which is greater than the angle φ at the tip of the pressure pin 427, the suspension finger 403 is free to pivot about the longitudinal axis of the finger 403 as pressure is exerted on the distal end of the finger 403 by the pressure pin 427. The force applied to each suspension finger 403 is translated to its mounted slider 304 and causes a regulated force to be applied to the slider 304 to ensure that the slider 304 contacts each blending surface 303 with a desired force. The preferred amount of force depends upon the material of the slider, the amount of blending desired, the duration in time of the operation, the texture of the blending surface 303, and the amplitude and velocity of the relative motion of the sliders 304 with respect to the blending surface 303.

FIG. 6f best illustrates a slider 304 mounted within the cavity of a suspension finger 403 and in contact with a pair of blending surfaces 303. In accordance with the illustrated embodiment of the present invention, the cavity is defined by "nest fences" 437, 438 which precisely locate a slider 304 within the suspension finger 403. In accordance with the illustrated embodiment of the present invention, the nest fences 437, 438 are affixed by an epoxy glue. A step 439 in the suspension finger locates a first nest fence 437 with respect to the other features of the suspension finger 403. The second nest fence 438 is preferably located by placing a slider 304 in contact with the first nest fence 437 and then placing the second nest fence 438 in close proximity to, or contact, with the slider 304.

In accordance with the illustrated embodiment of the present invention, the slider 304 is held in the place within the suspension finger 403 by vacuum pressure. A preferably non-porous resilient material 443 (such as a rubber cushion)

lines the top of the cavity. A central opening in the cushion 443 is aligned with a vacuum orifice 441. The orifice 441 is in fluid communication with an air tube 440. The air tube 440 is preferably an extension of the suspension finger 403. Each air tube 440 of the retaining fixture 400 is coupled by a vacuum hose 442 and an air path (not shown) through the frame 401 to a main vacuum connector 444 located on the frame 401. A source of regulated vacuum pressure is connected to the main vacuum connector 444. The resilient material 443 provides a generally air tight seal between the orifice 441 and a slider 304 placed in contact with the resilient material 443. The resilient material 443 also helps spread the pressure force uniformly on the back of the slider and allows the slider to gimbal. Therefore, when sufficient vacuum pressure is applied to the main vacuum connector 444, a slider 304 associated with each suspension finger 403 is secured to the associated finger 403. In an alternative embodiment in which the longitudinal axis of the slider 304 is to be held at other than 0° with respect to the plane of the blending surface 303, such gimbaling may not be desirable. Therefore, in such embodiments a rigid material is used to maintain a vacuum seal between the slider and the orifice 441 and prevent rotational motion of the slider 304 about any axis that is generally parallel to the blending surface 303. Alternatively, sufficient vacuum pressure may be generated to maintain the slider in position without the need for any such sealing material.

In an alternative embodiment, the slider 304 may be secured to the retaining fixture by an adhesive, or by a frictional fit (such as by being captivated between elements of the retaining fixture), compression fit (such as by having a compressible layer which exerts a pressure between the slider and a rigid ledge or lip), or any other means for securing the slider to the retaining fixture. Furthermore, in an alternative embodiment, at least one slider 304 is secured directly to a frame 401.

Figure 6A:
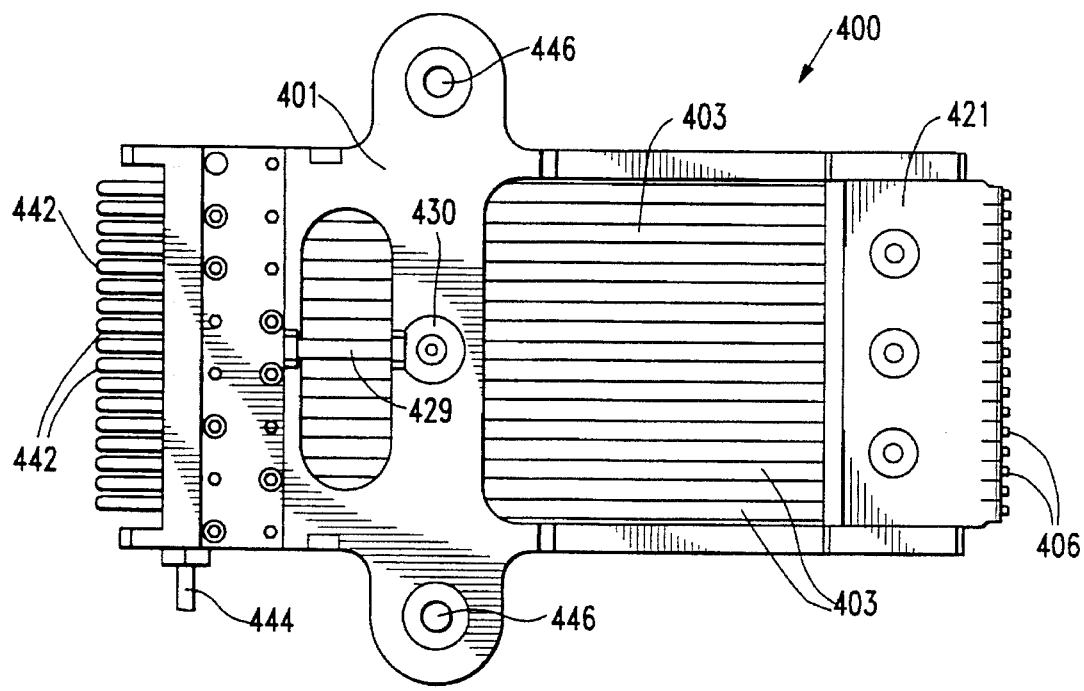
FIG. 6a is a top plan view of an inventive retaining fixture with suspension fingers installed.
Figure 6B:
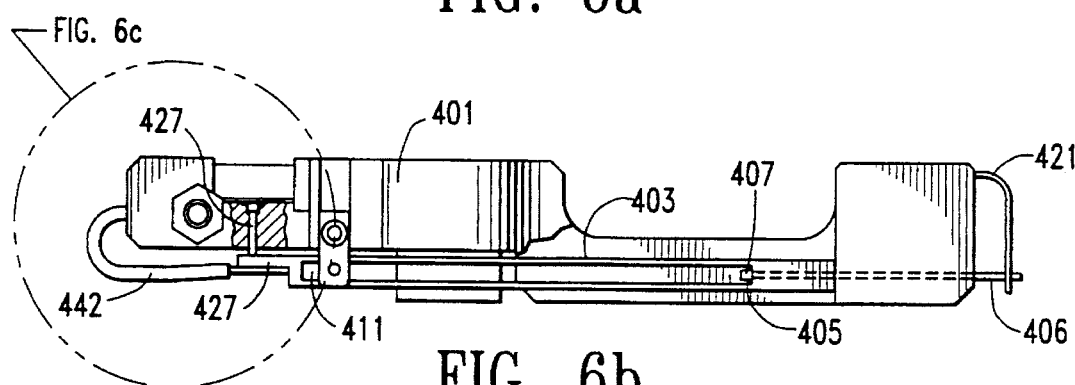
FIG. 6b is a side cutaway view of an inventive retaining fixture with suspension fingers installed.
Figure 6C:
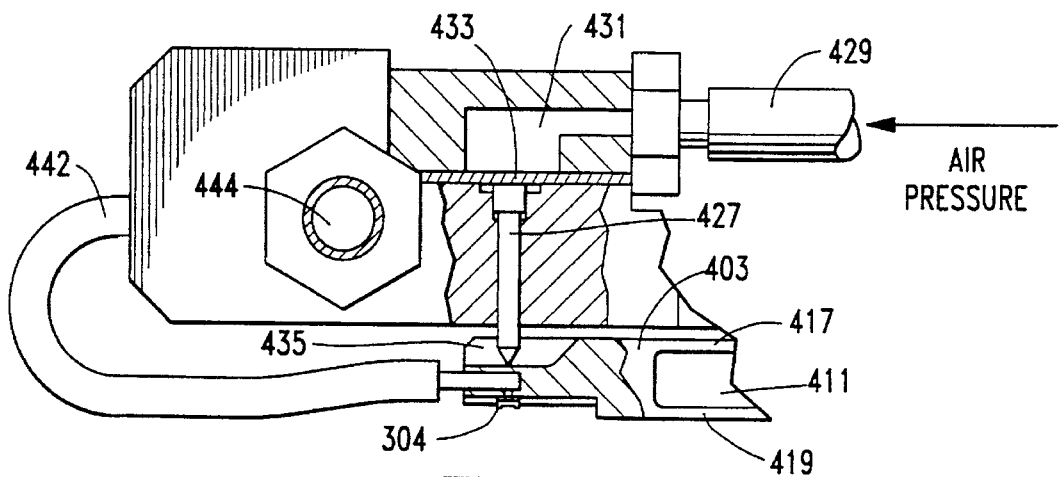
FIG. 6c is an enlarged view of a portion of the side cutaway view of FIG. 6b.
Figure 7A:
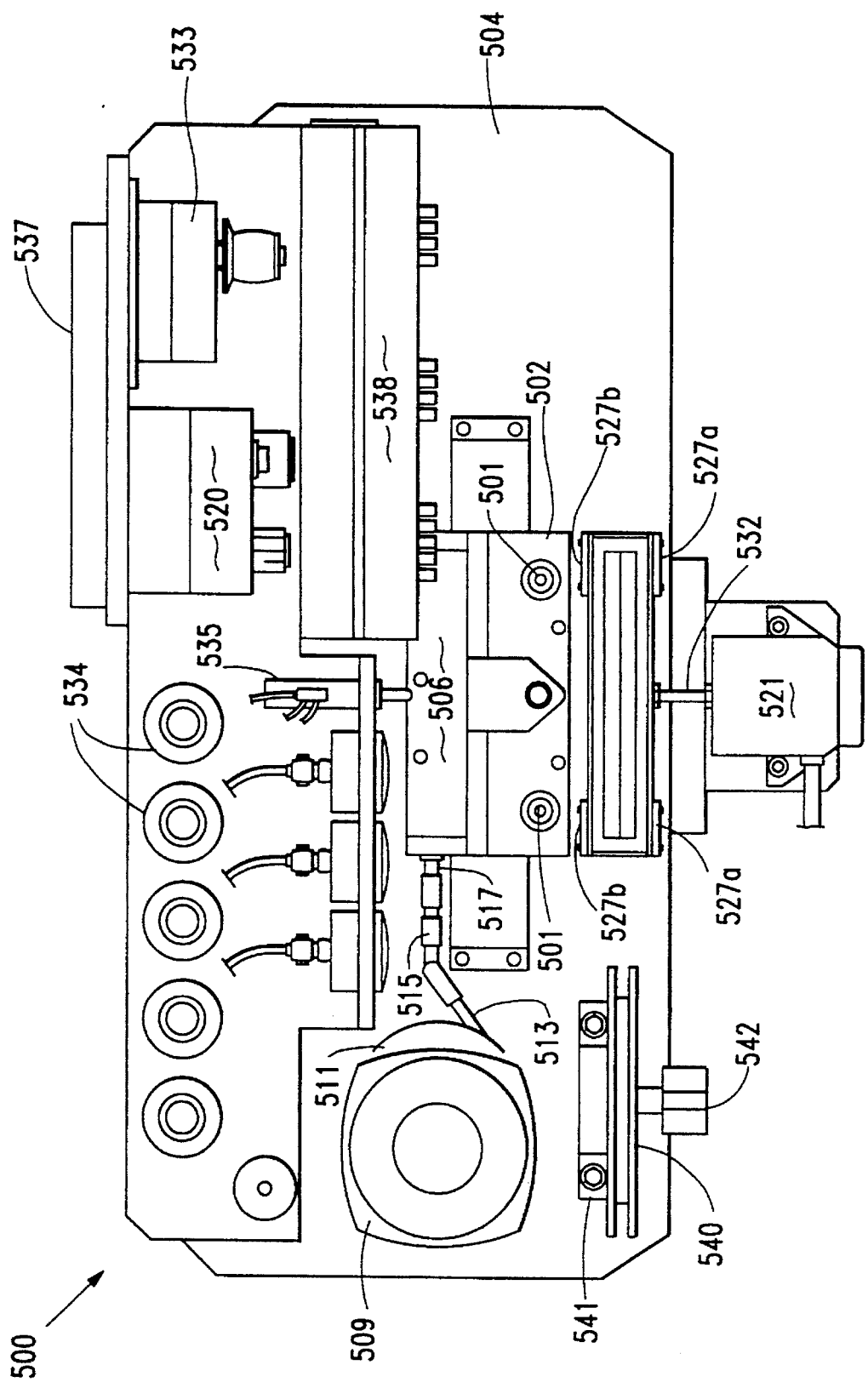
FIG. 7a is a top plan view of a blending apparatus in accordance with one embodiment of the present invention.

FIG. 7a is a top plan view of one embodiment of the blending apparatus 500 of the present invention upon which the retaining fixture depicted in FIG. 5, or the retaining fixture 400 depicted in FIGS. 6a–6f, is mounted. The following description relates to a blending apparatus 500 to be used with the retaining fixture depicted in FIGS. 6a–6f. It will be clear to one of ordinary skill in the art how the blending apparatus 500 may be adapted for use with the retaining fixture illustrated in FIG. 5. Two locator pins 501 located on the top surface of a retaining fixture sled 502 mate with two corresponding locating holes 446 in the retaining fixture 400. Such mating of the pins 501 and holes 446 results in alignment of sliders 304 mounted in the suspension fingers 403 of the retaining fixture 400 with the blending bars 305b, such that the rail edges 301, 309 to be blended are in contact with the blending surfaces 303 as depicted in FIG. 6f.

Figure 7B:
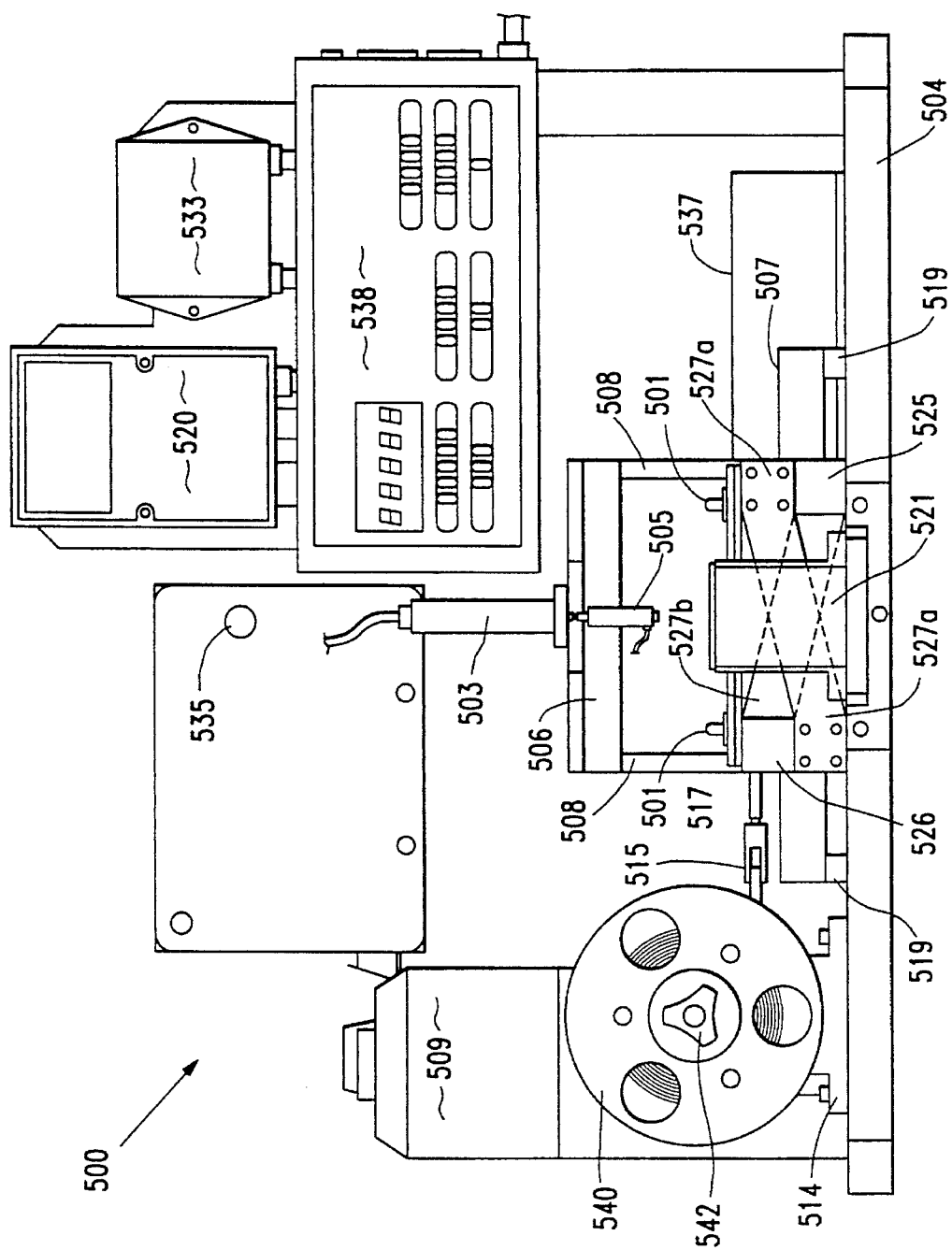
FIG. 7b is a front plan view of a blending apparatus in accordance with one embodiment of the present invention.
Figure 7C:
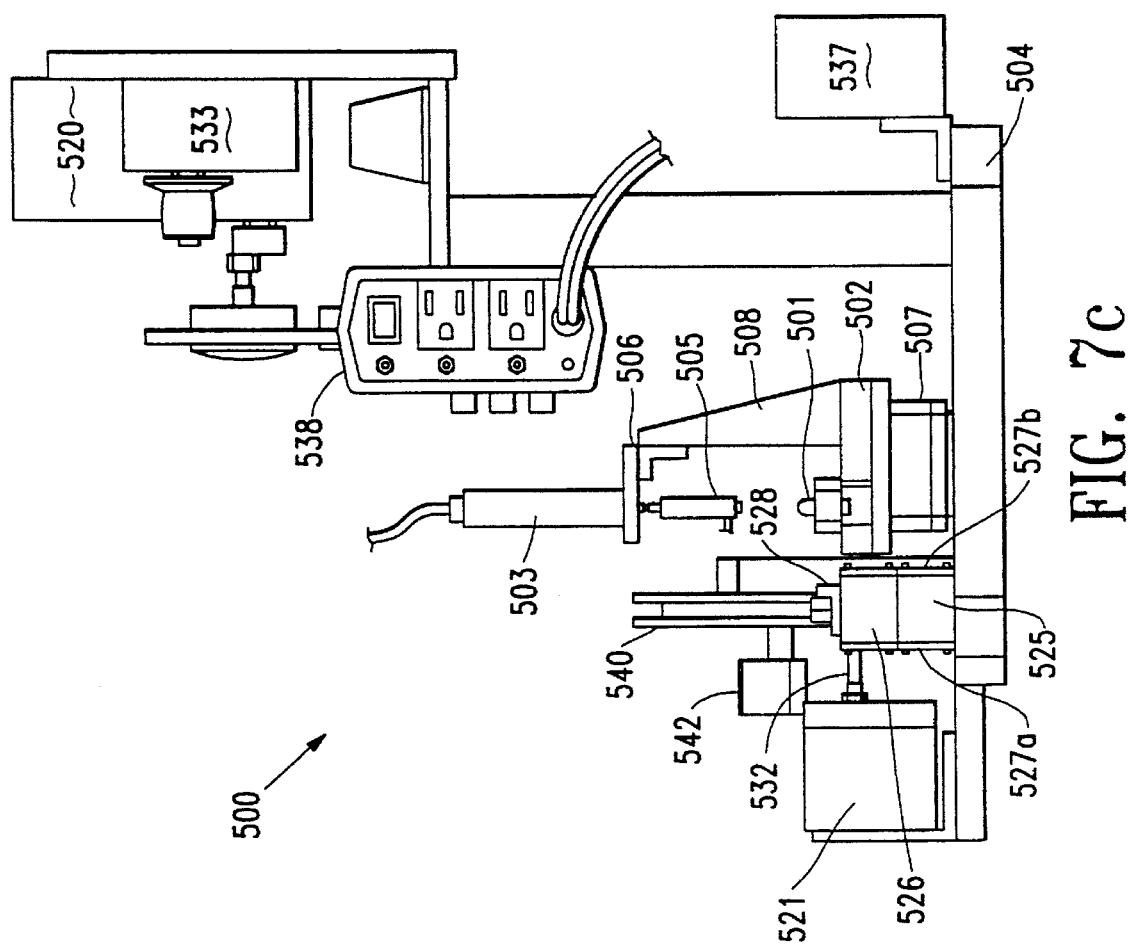
FIG. 7c is a side plan view of a blending apparatus in accordance with one embodiment of the present invention.

Refer now to FIG. 7b and FIG. 7c. FIG. 7b is a front plan view of the blending apparatus 500 of FIG. 7a. FIG. 7c is a side plan view of the blending apparatus 500 of FIG. 7a. A pneumatic piston 503 is mounted over the retaining fixture sled 502 on a horizontal support structure 506 supported by two vertical support structures 508. The pneumatic piston 503 is actuated to drive a manifold 505 into contact with the main air coupling 430 of the retaining fixture 400. The pressure exerted by the manifold 505 on the main air coupling secures the retaining fixture 400 to the blending apparatus 500. In addition, the manifold 505 places the main air coupling in fluid communication with a source of air pressure which pressurizes the air chamber 431 (see FIG. 6c).

In the illustrated embodiment, the retaining fixture sled 502 is mounted on a low friction mounting 507 (such as a conventional air slide part no. 300-B-150-T6 available from Dover Instrument Corporation of Massachusetts), which is mounted on a base plate 504 and allows the sled 502 to move smoothly back and forth along a linear path. The sled 502 is propelled by a propulsion system, such as a conventional rotary motor 509 having a rotating wheel 511 coupled to a first coupling shaft 513. In the illustrated embodiment of the present invention, the first coupling shaft 513 is coupled to a universal joint 515, which is in turn coupled to a second coupling shaft 517, which is firmly attached to the sled 502. Thus, as the wheel 511 rotates under the power of the rotary motor 509, the sled 502 preferably slides back and forth in one dimension on the low friction mounting 507. For convenience, the low friction mounting 507 may be mounted on standoffs 519. A conventional motor controller 520 controls the speed and direction of rotation of the rotary motor 509.

Figure 8:
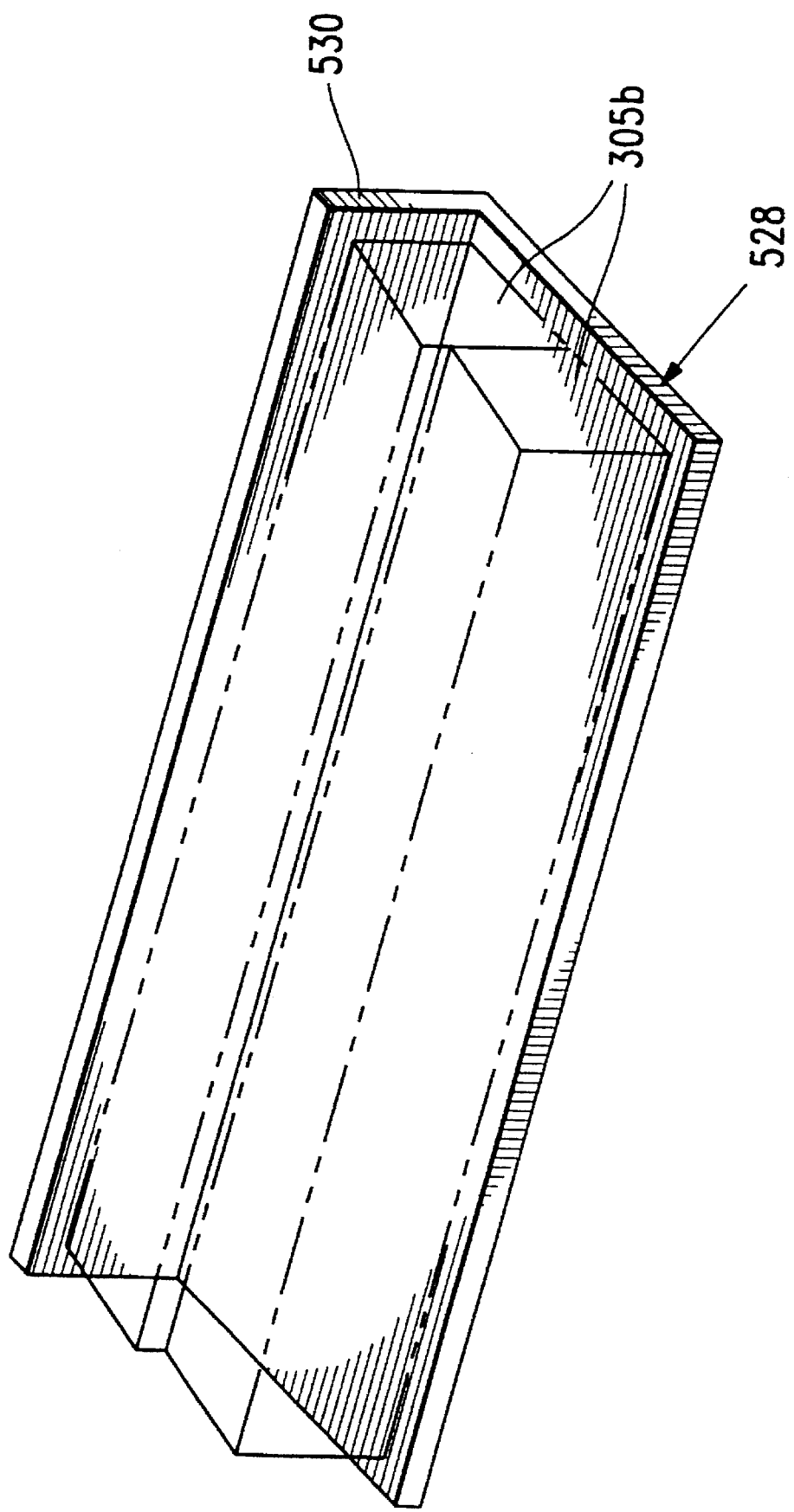
FIG. 8 is a perspective view of a reference rail and the blending bars mounted thereon.

In accordance with the illustrated embodiment of the present invention, the blending bars 305b are mounted on a blending bar mounting fixture comprising a lower block 525 and an upper block 526. A reference rail 528 is mounted on the upper block 526. FIG. 8 is a perspective view of the reference rail 528 and the blending bars 305b mounted thereon. Blending bars 305b are shown in broken lines. The reference rail 528 is generally L-shaped. The rear portion 530 of the reference rail 528 aligns the blending bars 305b. The blending bars 305b may be fixed by epoxy or other means to the reference rail 528, and the reference rail is, in turn, fixed by epoxy or other means to the tipper block 526.

The lower block is fixed to the base plate 504 of the apparatus 500. The upper block 526 is spring mounted to the lower block 525 by two offset spring brackets 527a, 527b. A first end of the spring 527a is affixed to the upper block 526 near an end of the upper block 526. A first end of the spring 527b is affixed to the upper block 526 on the opposing side, near the opposing end of the upper block 526. Similarly, a second end of the spring 527a is affixed to the lower block 525 near an end of the lower block 525, and a second end of the spring 527b is affixed to the lower block 525 on the opposing side, near the opposing end of the lower block 525. The offset spring arrangement is best illustrated in FIG. 7b.

The spring mounting of the upper block 526 to the lower block 525 permits the upper block to move in a horizontal direction generally perpendicular to the longitudinal axis of the blocks 525, 526 when a motion system is activated. In the illustrated embodiment, the motion system includes a conventional vibrator 521 (such as model 223 distributed by Automation Device of Pennsylvania) mechanically coupled to the upper block 526 by a coupling strut 532. A conventional vibrator controller 533 controls the frequency of vibrator 521.

In accordance with the illustrated embodiment of the present invention, pneumatic pressure generated by a conventional source is controlled by a series of conventional pressure regulators 534. A conventional 4-way spool valve 535 is preferably coupled to the regulators 534 to provide a means for applying air pressure to the pneumatic piston 503, the air chamber 431, and vacuum pressure to retain the sliders 304. Vacuum pressure is generated by a conventional vacuum pump 537 in fluid communication with the main vacuum connector 444.

In accordance with the illustrated embodiment of the present invention, a conventional timer 538 provides electrical power to both the vibrator 521 and to the rotary motor 509 for a predetermined duration.

For convenience, the illustrated embodiment includes a tape spool 540 mounted on a support bracket 541 for holding a roll of abrasive lapping tape. The illustrated spool has a tri-prong plastic knob 542 which aids in rolling or unrolling the lapping tape. In the illustrated embodiment, the lapping tape is applied to the blending bars 305b to serve as the blending surface 303.

Operation of the Illustrated Embodiment

In accordance with the embodiments of the present invention illustrated in FIGS. 4a–8, with the retaining fixture 400 removed from the blending apparatus 500, a vacuum line is coupled to the main vacuum connector 444. At least one slider 304 is positioned within the cavity of a corresponding suspension finger 403. Vacuum pressure is applied to each slider 304 through the vacuum orifice 441 of each corresponding suspension finger 403, such as by actuating a first toggle switch of the spool valve 535. The retailing fixture 400 is then mounted on the locating pins 501 of the blending apparatus 500. The pneumatic piston 503 is actuated, such as by actuating a second toggle switch of the spool valve 535. Once the manifold 505 is seated on the main air coupling 430 of the retaining fixture 400, the pneumatic pressure is applied through the manifold 505 to the retaining fixture 400, such as by actuating a third toggle switch of the spool valve 535. Applying pressure to the main air coupling 430 causes downward pressure to be exerted on each slider 304 installed within the retaining fixture 400.

With the retaining fixture in place and pneumatic pressure and vacuum pressure applied, the vibrator 521 is operated at a predetermined frequency for a predetermined duration. The rotary motor 509 is preferably operated concurrently at a predetermined rotational velocity. The duration may be determined by programming the timer 538. Operation of the rotary motor 509 and the vibrator 521 cause relative motion of the slider 304 in two essentially orthogonal directions with respect to the blending surfaces 303. Accordingly, due to the abrasive texture of the blending surfaces 303, and the relative angle of the blending surfaces 303 with respect to the plane of each slider 304, the rail edges 301,309 of each slider 304 are ground (or blended) by removal of a portion of the material that comprises the edges 301, 309 of the rails.

Blend and Trim Process

Figure 9:
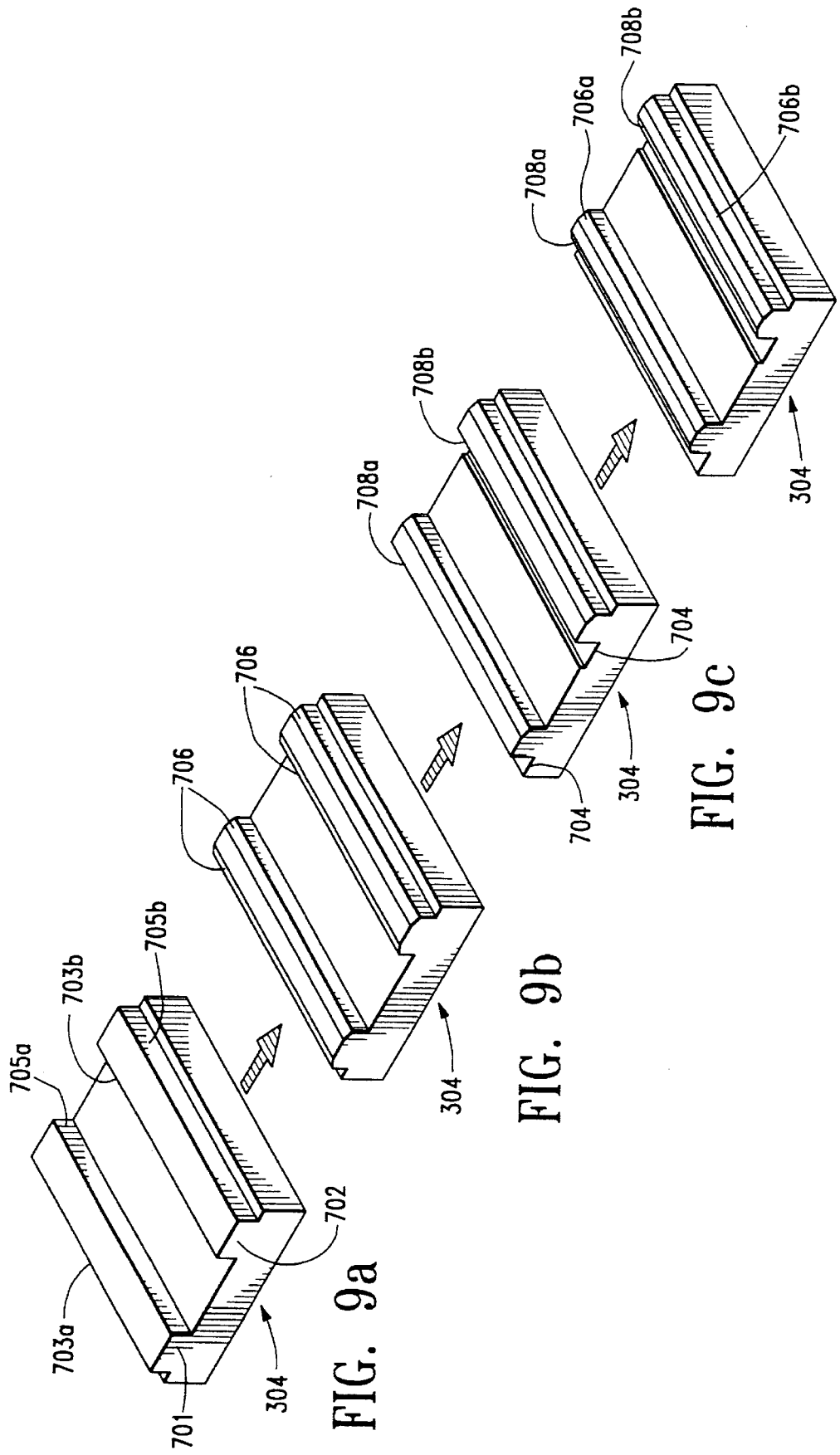
FIGS. 9a–d are an illustration of an inventive process for blending in accordance with one embodiment of the present invention.

An alternative embodiment of the present invention in accordance with a blend and trim process is illustrated in FIGS. 9a–9d. In the embodiment illustrated, a slider 304 having, for example, two rails 701, 702 (FIG. 9a) may be blended to a first depth using conventional blending techniques to create edge contours 706 on the inside rail edges 703b, 705a (FIG. 9b). A conventional trim grinding process is then used to remove a portion of the air bearing surface on the outside edge 703a of one rail 701, and on the inside edge 703b of the other rail 702, leaving two trimming slots 704 (FIG. 9c). The slider 304 is once again blended to a second depth that is shallower than the first depth. In this way, the new abrupt edges 708 of the slider 304 left by the trim grinding process are blended, but to a lesser amount then are the previously blended edges 706a, 706b. The process is preferably performed only once. However, this process may be repeated as many times as there are edges to be blended. The process results in a large differential edge contour between edges 708a, 708b and the edges 706a, 706b of the rails 701, 702 of the slider 304. That is, change in the contour of edges 706a, 706b is greater than the change in the contour at edges 708a, 708b. In an alternative embodiment, only one edge grind is performed after the initial blend. Additionally, the second blending step may be eliminated.

Edge differential Blending by Spacing Difference

Figure 10:
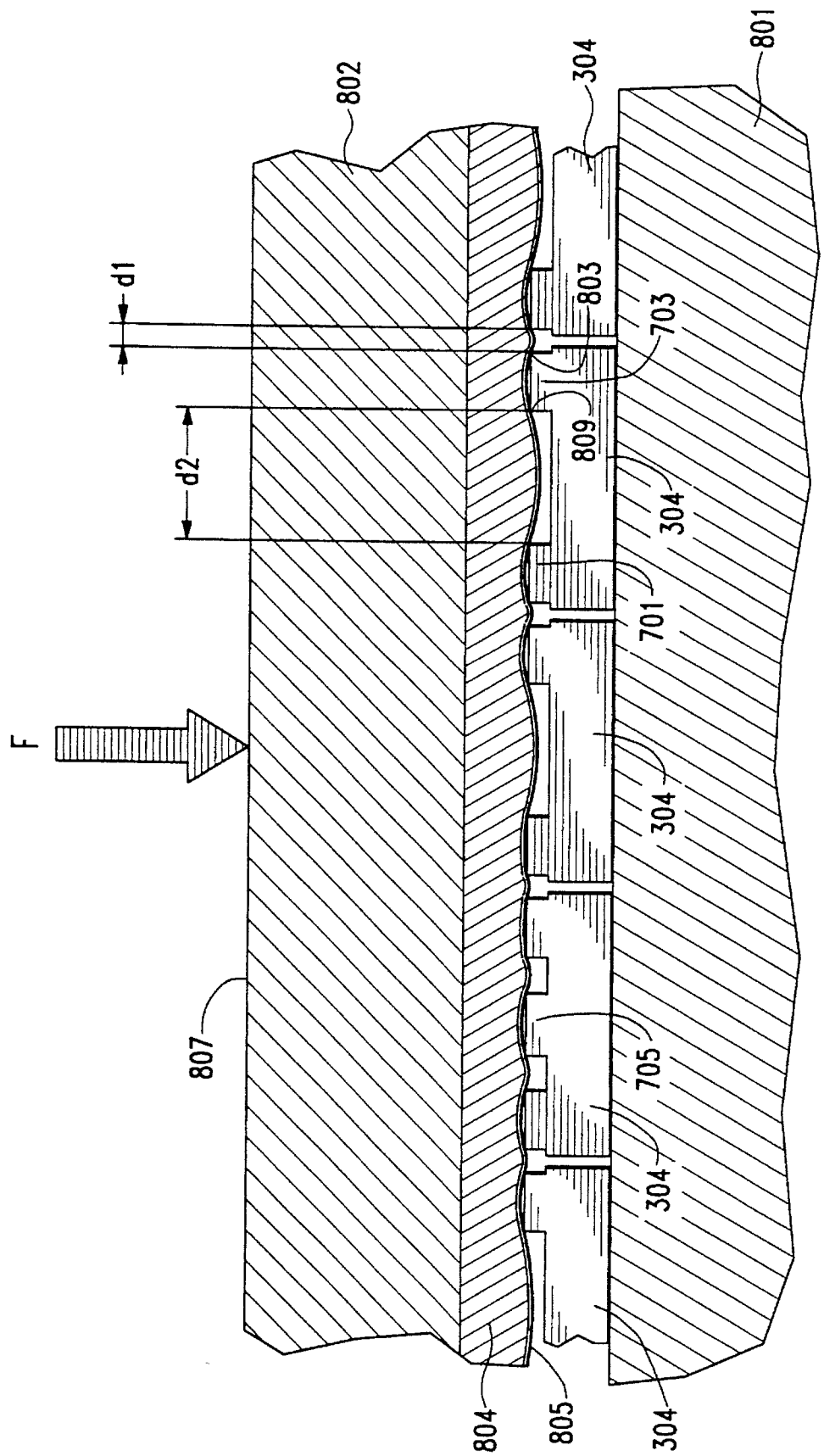
FIG. 10 is an illustration of an inventive process for blending in accordance with another embodiment of the present invention.

FIG. 10 illustrates another alternative embodiment of the present invention. In the embodiment illustrated in FIG. 10, a plurality of sliders 304 are blended at once. Each slider 304 is placed alongside another slider 304 on a holding fixture 801. Any means for retaining the sliders 304 to the holding fixture 801 may be used. For example, sliders 304 may be held securely to the holding fixture 801 by vacuum pressure, adhesive, double-back tape, or clamping mechanisms. A load bar 802 is placed in contact with a cushion 804 of compressible material. A force applied to a loading surface 807 of the load bar 802 causes the rails 701, 703 of the sliders 304 to deform an abrasive surface 805 of the cushion 804.

The spacing d1 between each slider 304, together with the elasticity of the cushion 804 and the force exerted on the loading surface 807 of the load bar 802, determines the corner pressure exerted by the abrasive surface 805 against the outer edges 803 of the rails 701, 703 to be blended. The distance d2 between the rails 701, 703 of the same slider 304, together with the elasticity of the cushion 804 and the force exerted on the loading surface 807 of the load bar 802, determines the corner pressure exerted by the abrasive surface 805 against the inner edges 809 of the rails 701, 703 to be blended. Controlling the corner pressure, in effect, controls the angle and amount of blending that results from the blending process. Therefore, since the distance d1 can be either greater than or less than the distance d2, the spacing of the sliders 304 can be purposely controlled to produce large differential edge contours between the edges 803 and 809. In an alternative embodiment, either the distance d1 may be essentially zero. In an alternative embodiment, a third rail 705 is provided on the slider 304 to alter the edge blend ratio by altering the spacing between points of contact between the slider and the cushion 804. Such a third rail 705 may be removed later by an additional operation. In accordance with another embodiment of the present invention, each slider 304 may be oriented at 180 degrees with respect to each of the adjacent sliders 304. Thus, the spacing between edges that are on the same side of adjacent sliders is equal.

Conclusion

Figure 11:
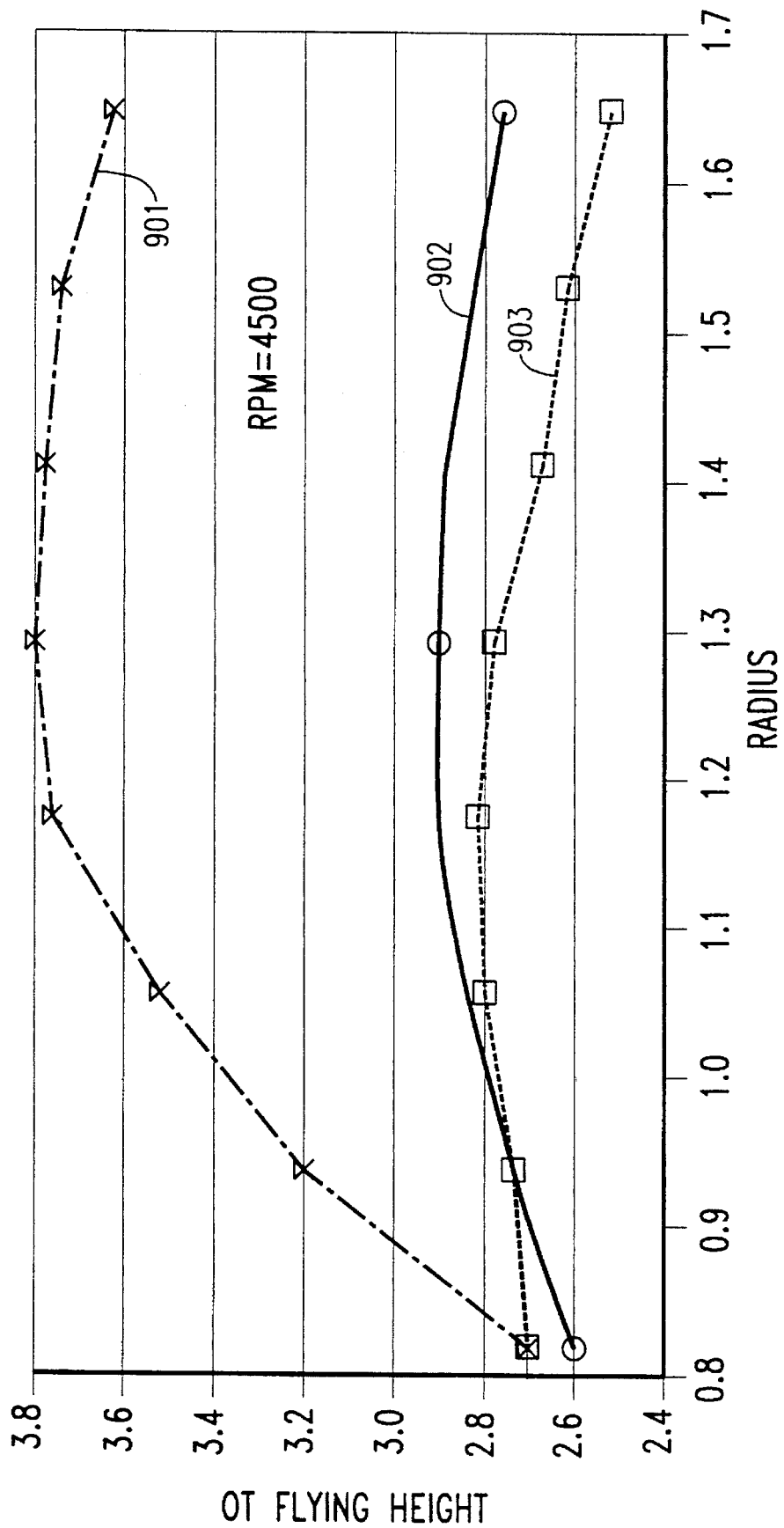
FIG. 11 is a graph illustrating flying height verses radius for sliders modified by the present inventive method and apparatus, and for sliders modified by prior art techniques.

FIG. 11 is a graph showing the difference between the flying high of sliders over a rotating disk platter of a disk drive device. A first curve 901 illustrates actual recorded data for the flying height verses disk radius for a slider which has been blended using a prior art technique. A second curve 902 illustrates the theoretical flying height verses disk radius for a slider which has been blended using the method of the present invention. A third curve 903 illustrates the actual recorded data for the flying height verses disk radius for a slider which has been blended using the present invention.

As can be seen, sliders that have been blended using an embodiment of the inventive blending method and apparatus fly lower at each and every radial distance from the center of the disk, from a distance of 0.8 inches to a distance of 1.7 inches. In particular, the flying height of a slider blended in accordance with the present invention is significantly lower at greater distances. Furthermore, the fact that the flying height is relatively constant with changes in radial distance is highly desirably, since it is desirable to maintain the same density of data (i.e., number of flux transitions per inch) at each radial distance.

A number of embodiments of the present invention have been described. Nevertheless, it will be understood that various modifications may be made without departing from the spirit and scope of the invention. For example, the present invention may incorporate any means to hold and position each slider such that the edge(s) of the slider are placed in contact with the blending surface(s). Particular aspects of the retaining fixture illustrated herein are provided only as an example of one method by which the present invention may be implemented. In addition, other particular aspects of the illustrated embodiments of the present invention, such as the use of an air slide, incorporation of a reel for holding lapping tape, incorporation of a pneumatic piston to secure the retaining fixture, use of a rotary motor and a vibrator, etc., are presented as an illustration of the present invention, and are not considered to be limiting. Furthermore, any combination of motions by each blending bar and/or the sliders (and therefore the retaining fixture that holds the sliders) may be used to cause the abrasive blending surface to abrade the edge(s) of the sliders. Also, any means may be used to control the relative motion of the sliders with respect to the blending surfaces. Still further, the blending surface may be any generally abrasive surface that will abrade the edges of a slider rail.

Accordingly, it is to be understood that the invention is not to be limited by the specific illustrated embodiment, but only by the scope of the appended claims.

We claim:

1. A method for blending air bearing slider rails, each of the air bearing slider rails having a longitudinal axis and a first and a second longitudinal edge, the first and second longitudinal edges being disposed on substantially opposing sides of the air bearing slider rail, the method including the steps of:

(a) contacting only the first longitudinal edge of an air bearing slider rail with a first abrasive blending surface at a first predetermined angle with respect to rotation about the longitudinal axis of the slider rail;

(b) abrading the first longitudinal edge of the air bearing slider rail by generating a relative motion in two generally orthogonal directions between the air bearing slider rail and the blending surface to obtain a first blended longitudinal edge;

(c) contacting the second longitudinal edge of the air bearing slider rail with a second abrasive blending surface at a second predetermined angle; and (d) abrading the second longitudinal edge of the air bearing slider rail by generating a relative motion in two generally orthogonal directions between the air bearing slider rail and the second abrasive blending surface to obtain a second blended longitudinal edge asymmetrical to the first blended longitudinal edge.

2. The method of claim 1, wherein the step of contacting only the first longitudinal edge of an air bearing slider rail includes the step of preventing the slider rail from having rotational motion about any axis generally parallel to the abrasive blending surface.

3. The method of claim 1, wherein the step of contacting only the first longitudinal edge further includes:

(a) allowing the slider rail to rotate about at least a first axis of rotation orthogonal to the longitudinal axis of the slider rail; and (b) maintaining the slider rail at the first predetermined angle with respect to the blending surface and a second axis of rotation generally orthogonal to the first axis of rotation.

4. The method of claim 1, wherein the resulting blend on the first longitudinal edge of the air bearing slider is larger than the resulting blend on the second longitudinal edge of the air bearing slider.

5. The method of claim 1, further including the step of:

(a) using a retaining fixture to hold the air bearing slider in contact with the blending surface.

6. The method of claim 1, wherein the motion generated between the air bearing slider and the blending surface is a combination of a motion of the air bearing slider and a motion of the blending surface.

7. The method of claim 4, wherein the motion of the air bearing slider is generally orthogonal to the motion of the blending surface.

8. The method of claim 5, wherein the retaining fixture comprises a rotary shaft having a planar surface at a proximal end, the slider being affixed to the planar surface, and the rotary shaft being rotatably mounted within an arm housing.

9. The method of claim 8, wherein the predetermined angle is adjustable by controlling the vertical position of the distal end of the rotary shaft.

10. The method of claim 1, wherein the air bearing slider is held in contact by means of a constant force, the frequency and range of the motion is controlled, and the duration of time during which the relative motion persists is controlled.

11. The method of claim 10, further including the step of contacting only a first longitudinal edge of a second air bearing slider rail with a third abrasive blending surface at a third predetermined angle.

12. The method of claim 11, wherein the first longitudinal edge is of a first air bearing slider rail of a first slider, and wherein the first longitudinal edge of the second air bearing slider rail is of the first slider, the first longitudinal edge of the first air bearing slider rail being in contact with the first abrasive blending surface simultaneous with the first longitudinal edge of the second air bearing slider rail being in contact with the third abrasive blending surface.

13. The method of claim 11, wherein the step of contacting the first longitudinal edge of the second slider rail further includes preventing the second slider rail from rotating about any axis generally parallel to the third abrasive blending surface.

14. The method of claim 11, wherein the step of contacting the first longitudinal edge of the second slider rail further includes:

(a) allowing the second slider rail to rotate about a first axis of rotation generally parallel to the longitudinal axis of the second slider rail; and (b) maintaining the second slider rail at the third predetermined angle with respect to a second axis of rotation generally orthogonal to the first axis of rotation and generally parallel to the third blending surface.

15. The method of claims 1, 11, or 14 wherein the component of the relative motion between the air bearing slider rail and the blending surface which is orthogonal to the longitudinal axis of the air bearing slider is less than the distance between the rails of the slider.

16. The method of claim 1, further including the step of applying an abrasive material to the surface of a blending bar to form the blending surface.

17. The method of claim 1, further including the steps of:

(a) using a vibrator to generate relative motion between the slider and the blending surface; and (b) using a rotary motor to generate relative motion between the slider and the blending surface.

18. The method of claim 17, wherein the vibrator is coupled to the slider, and the rotary motor is coupled to the blending surface.

19. The method of claim 6, further including the step of:

(a) placing the retaining fixture on a retaining fixture sled;

(b) securing the retaining fixture on the retaining fixture sled by actuating a pneumatic piston; and (c) supplying air through the pneumatic piston to maintain constant pressure between the slider and the blending surface.

20. The method of claim 5, further including the step of securing the slider to the retaining fixture using vacuum pressure.

21. A method of blending an air bearing slider having rails, each rail having an inside and an outside longitudinal edge, including the steps of:

(a) blending a slider to provide edge contours at the inside and outside longitudinal edges of at least some rails, including generating a relative motion in two generally orthogonal directions between the rail and a blending surface; and (b) trimming at least part of at least one rail to remove at least a portion of a contoured longitudinal edge, thereby forming a trimmed longitudinal edge; wherein the inside and outside longitudinal edges are asymmetrically blended.

22. The method of claim 21, further including the step of blending the slider after trimming the at least one rail to provide an edge contour to at least one trimmed longitudinal edge formed by the trimming step.

23. The method of claim 21, wherein there is a differential edge contour between the at least one trimmed longitudinal edge and those longitudinal edges that were blended in step a), but were not trimmed in step b).

24. A method of blending an air bearing slider having rails, each air bearing rail having an air bearing surface, including the steps of:

(a) positioning at least one slider on a holding fixture spaced apart a predetermined distance from a spacer, the air bearing surface of at least one rail being exposed;

(b) contacting the exposed air bearing surface rail with a layer of compressible material having an abrasive blending surface;

(c) applying a predetermined force to the layer of compressible material to cause the abrasive blending surface to deform; and (d) generating a relative motion between each slider and the abrasive blending surface;

whereby the deformation of the abrasive blending surface due to the contact between each slider and the abrasive blending surface is controlled by the distance between each slider and an adjacent spacer and the mount of pressure required to deform the layer of compressible material, and thereby the amount of edge contouring at each longitudinal edge of the air bearing surface of each rail is controlled.

25. The method of claim 24, wherein a third rail is provided on at least one slider, the at least one slider having a body, the third rail being disposed between a first rail and a second rail of the slider, each rail of the at least one slider protruding a predetermined distance from the body of the slider, and further including the steps of removing the third rail after the slider has deformed by the abrasive blending surface.

26. The method of claim 24, wherein the spacer is a slider.

27. A blending apparatus for blending longitudinal edges of an air bearing slider, the slider having at least one inside and outside longitudinal edge, the apparatus including:

(a) at least one blending bar, each having an abrasive blending surface;

(b) a slider retaining fixture for holding one longitudinal edge of an air bearing slider in contact with a corresponding blending surface; and (c) a propulsion system for generating a relative motion in two generally orthogonal directions between the slider and the blending surface;

wherein the inside and outside longitudinal edges are asymmetrically blended.

28. The apparatus of claim 27, further including:

(a) means for allowing the slider to rotate about a first axis generally parallel to the longitudinal axis of the slider; and (b) means for maintaining the slider rigid about at least a second axis generally orthogonal to the first axis.

29. The apparatus of claim 27, further including:

(a) means for maintaining the slider generally rigid with respect to the a first axis of rotation generally parallel to the longitudinal axis of the slider; and (b) means for maintaining the slider generally rigid about at least a second axis of rotation generally orthogonal to the first axis.

30. The apparatus of claim 27, further including a motion system for generating relative motion between the slider and the blending surface.

31. The apparatus of claim 30, wherein:

(a) the propulsion system includes a rotary motor coupled to the slider; and (b) the motion system includes a vibrator coupled to the blending surface.

32. The apparatus of claim 27, wherein the propulsion system further includes a mounting means for mounting the at least one blending bar, such that the blending bars are moved smoothly by the rotary motor.

33. The apparatus of claim 27, wherein the blending bar is mounted on an air slide to reduce friction as the blending bar is moved by the rotary motor.

34. The apparatus of claim 27, further including:

(a) a base plate;

(b) a first block mounted to the base plate;

(c) a second block, mounted to the first block, upon which the slider retaining fixture is mounted; and (d) an offset spring bracket mounted between the first and second block to allow the second block to move with respect to the first block.

35. The apparatus of claim 34, wherein the second block is coupled to the vibrator.

36. The apparatus of claim 35, further including a coupling strut for coupling the second block to the vibrator.

37. The apparatus of claim 33, further including:

(a) a universal joint;

(b) a first coupling shaft coupled to the proximal end of the universal joint; and (c) a second coupling shaft, the proximal end of the second coupling shaft being coupled to the distal end of the universal joint, and the distal end of the second coupling shaft being essentially rigidly coupled to the rotary motor, such that rotation of the distal end of the second coupling shaft causes the retaining fixture to move essentially in one dimension.

38. The apparatus of claim 27, wherein the retaining fixture includes:

(a) a frame mounted on the apparatus a predetermined distance from the blending surface; and (b) at least one suspension finger mounted on the frame, including;

(1) a cavity for receiving a slider; and (2) a means for maintaining constant pressure between the slider and the blending surface.

39. The apparatus of claim 38, wherein:
(a) the suspension finger further includes;
   (1) a first and a second nest fence which define two walls of the cavity, each for positioning the slider with the cavity;
   (2) a V-shaped recess; and
   (3) a bore; and
(b) the frame further includes;
   (1) an air chamber;
   (2) diaphragm having a first surface exposed to the interior of the chamber, and a second surface opposed to the first surface; and
   (3) pressure pin, the proximal end of which is in contact with the second surface of the diaphragm, and the distal end of which is in contact with a corresponding V-shaped recess; and
(c) pressure between each slider mounted on the retaining fixture and the blending surface is less than a predetermined amount when the pressure in each chamber is less than or equal to atmospheric pressure, and the pressure between each slider and the blending surface is proportional to the air pressure within each chamber when the air pressure within each air chamber is greater than atmospheric pressure.

40. The method of claim 11 wherein the first and third predetermined angles are substantially the same and the second predetermined angle is different from the first and third predetermined angles.

\* \* \* \* \*